United States Patent [19]
Keeth

[11] Patent Number: 6,029,250
[45] Date of Patent: Feb. 22, 2000

[54] METHOD AND APPARATUS FOR ADAPTIVELY ADJUSTING THE TIMING OFFSET BETWEEN A CLOCK SIGNAL AND DIGITAL SIGNALS TRANSMITTED COINCIDENT WITH THAT CLOCK SIGNAL, AND MEMORY DEVICE AND SYSTEM USING SAME

[75] Inventor: Brent Keeth, Boise, Id.

[73] Assignee: Micron Technology, Inc., Boise, Id.

[21] Appl. No.: 09/150,079

[22] Filed: Sep. 9, 1998

[51] Int. Cl.[7] ........................................................ G06F 1/04
[52] U.S. Cl. ............................................. 713/400; 711/167
[58] Field of Search .................................... 713/400, 503, 713/600; 711/167; 327/100, 141, 164, 165; 331/12, 18, 172, 175, 177 R

[56] References Cited

U.S. PATENT DOCUMENTS

| | | | |
|---|---|---|---|
| 3,633,174 | 1/1972 | Griffin | 340/172.5 |
| 4,077,016 | 2/1978 | Sanders et al. | 331/4 |
| 4,096,402 | 6/1978 | Schroeder et al. | 307/362 |
| 4,404,474 | 9/1983 | Dingwall | 307/260 |
| 4,481,625 | 11/1984 | Roberts et al. | 370/85 |

(List continued on next page.)

FOREIGN PATENT DOCUMENTS

| | | |
|---|---|---|
| 0 295 515 A1 | 12/1988 | European Pat. Off. . |
| 0 406 786 A1 | 1/1991 | European Pat. Off. . |
| 0 450 871 A2 | 10/1991 | European Pat. Off. . |
| 0 476 585 A3 | 3/1992 | European Pat. Off. . |
| 0 655 741 A2 | 5/1995 | European Pat. Off. . |

(List continued on next page.)

OTHER PUBLICATIONS

Alvarez, J. et al. "A Wide–Bandwidth Low Voltage PLL for PowerPC™ Microprocessors" IEEE IEICE Trans. Electron., vol. E–78. No. 6, Jun. 1995, pp. 631–639.

Anonymous, "Programmable Pulse Generator", IBM Technical Disclosure Bulletin, vol. 17, No. 12, May 1975, pp. 3553–3554.

Anonymous, "Pulse Combining Network", IBM Technical Disclosure Bulletin, vol. 32, No. 12, May 1990, pp. 149–151.

Anonymous, "Variable Delay Digital Circuit", IBM Technical Disclosure Bulletin, vol. 35, No. 4A, Sep. 1992, pp. 365–366.

(List continued on next page.)

*Primary Examiner*—Thomas M. Heckler
*Attorney, Agent, or Firm*—Dorsey & Whitney LLP

[57] ABSTRACT

A method and circuit adaptively adjust the timing offset of a digital signal relative to a clock signal output coincident with that digital signal to enable a latch receiving the digital signal to store the digital signal responsive to the clock signal. The digital signal is applied to the latch, and stored in the latch responsive to the clock signal. The digital signal stored in the latch is evaluated to determine if the stored digital signal has an expected value. The timing offset of the digital signal is thereafter adjusted relative to the clock signal. and the digital signal is once again stored in the latch responsive to the clock signal at the new timing offset. A number of digital signals at respective timing offsets relative to the clock signal are stored and evaluated, and a final timing offset of the digital signal is selected from the ones of the timing offsets that cause the latch to store the digital signal having the expected value. The timing offset of the digital signal is thereafter adjusted to the selected final timing offset. A read synchronization circuit may adaptively adjust the timing offset of digital signals in this manner, and such a read synchronization circuit may be utilized in many types of integrated circuits, including packetized dynamic random access memories, memory systems including a memory controller and one or more such packetized dynamic random access memories, and in computer systems including a plurality of such packetized dynamic random access memories.

32 Claims, 7 Drawing Sheets

U.S. PATENT DOCUMENTS

| | | | |
|---|---|---|---|
| 4,511,846 | 4/1985 | Nagy et al. | 328/164 |
| 4,514,647 | 4/1985 | Shoji | 307/269 |
| 4,600,895 | 7/1986 | Landsman | 331/1 A |
| 4,638,187 | 1/1987 | Boler et al. | 307/451 |
| 4,687,951 | 8/1987 | McElroy | 307/269 |
| 4,773,085 | 9/1988 | Cordell | 375/120 |
| 4,789,796 | 12/1988 | Foss | 307/443 |
| 4,893,087 | 1/1990 | Davis | 328/14 |
| 4,902,986 | 2/1990 | Lesmeister | 331/25 |
| 4,958,088 | 9/1990 | Farah-Bakhsh et al. | 307/443 |
| 4,984,204 | 1/1991 | Sato et al. | 365/189.11 |
| 5,020,023 | 5/1991 | Smith | 364/900 |
| 5,038,115 | 8/1991 | Myers et al. | 331/2 |
| 5,086,500 | 2/1992 | Greub | 395/550 |
| 5,087,828 | 2/1992 | Sato et al. | 307/269 |
| 5,122,690 | 6/1992 | Bianchi | 307/475 |
| 5,128,560 | 7/1992 | Chern et al. | 307/475 |
| 5,128,563 | 7/1992 | Hush et al. | 307/482 |
| 5,134,311 | 7/1992 | Biber et al. | 307/270 |
| 5,150,186 | 9/1992 | Pinney et al. | 357/42 |
| 5,165,046 | 11/1992 | Hesson | 307/270 |
| 5,179,298 | 1/1993 | Hirano et al. | 307/443 |
| 5,194,765 | 3/1993 | Dunlop et al. | 307/443 |
| 5,212,601 | 5/1993 | Wilson | 360/51 |
| 5,220,208 | 6/1993 | Schenck | 307/443 |
| 5,239,206 | 8/1993 | Yanai | 307/272.2 |
| 5,243,703 | 9/1993 | Farmwald et al. | 395/325 |
| 5,254,883 | 10/1993 | Horowitz et al. | 307/443 |
| 5,256,989 | 10/1993 | Parker et al. | 331/1 A |
| 5,257,294 | 10/1993 | Pinto et al. | 375/120 |
| 5,268,639 | 12/1993 | Gasbarro et al. | 324/158 R |
| 5,274,276 | 12/1993 | Casper et al. | 307/443 |
| 5,276,642 | 1/1994 | Lee | 365/189.04 |
| 5,278,460 | 1/1994 | Casper | 307/296.5 |
| 5,281,865 | 1/1994 | Yamashita et al. | 307/279 |
| 5,283,631 | 2/1994 | Koerner et al. | 307/451 |
| 5,295,164 | 3/1994 | Yamamura | 375/120 |
| 5,311,481 | 5/1994 | Casper et al. | 365/230.06 |
| 5,311,483 | 5/1994 | Takasugi | 365/233 |
| 5,321,368 | 6/1994 | Hoelzle | 328/63 |
| 5,337,285 | 8/1994 | Ware et al. | 365/227 |
| 5,347,177 | 9/1994 | Lipp | 307/443 |
| 5,347,179 | 9/1994 | Casper et al. | 307/451 |
| 5,355,391 | 10/1994 | Horowitz et al. | 375/36 |
| 5,361,002 | 11/1994 | Casper | 327/530 |
| 5,390,308 | 2/1995 | Ware et al. | 395/400 |
| 5,400,283 | 3/1995 | Raad | 365/203 |
| 5,408,640 | 4/1995 | MacIntyre et al. | 395/550 |
| 5,410,263 | 4/1995 | Waizman | 327/141 |
| 5,416,436 | 5/1995 | Rainard | 327/270 |
| 5,420,544 | 5/1995 | Ishibashi | 331/11 |
| 5,428,311 | 6/1995 | McClure | 327/276 |
| 5,430,676 | 7/1995 | Ware et al. | 365/189.02 |
| 5,432,823 | 7/1995 | Gasbarro et al. | 375/356 |
| 5,438,545 | 8/1995 | Sim | 365/189.05 |
| 5,440,260 | 8/1995 | Hayashi et al. | 327/278 |
| 5,440,514 | 8/1995 | Flannagan et al. | 365/194 |
| 5,446,696 | 8/1995 | Ware et al. | 365/222 |
| 5,448,193 | 9/1995 | Baumert et al. | 327/156 |
| 5,451,898 | 9/1995 | Johnson | 327/563 |
| 5,457,407 | 10/1995 | Shu et al. | 326/30 |
| 5,465,076 | 11/1995 | Yamauchi et al. | 331/179 |
| 5,473,274 | 12/1995 | Reilly et al. | 327/159 |
| 5,473,575 | 12/1995 | Farmwald et al. | 365/230.06 |
| 5,473,639 | 12/1995 | Lee et al. | 375/376 |
| 5,485,490 | 1/1996 | Leung et al. | 375/371 |
| 5,488,321 | 1/1996 | Johnson | 327/66 |
| 5,489,864 | 2/1996 | Ashuri | 327/161 |
| 5,497,127 | 3/1996 | Sauer | 331/17 |
| 5,498,990 | 3/1996 | Leung et al. | 327/323 |
| 5,506,814 | 4/1996 | Hush et al. | 365/230.03 |
| 5,508,638 | 4/1996 | Cowles et al. | 326/38 |
| 5,513,327 | 4/1996 | Farmwald et al. | 395/309 |
| 5,539,345 | 7/1996 | Hawkins | 327/150 |
| 5,544,203 | 8/1996 | Casasanta et al. | 375/376 |
| 5,552,727 | 9/1996 | Nakao | 327/159 |
| 5,568,075 | 10/1996 | Curran et al. | 327/172 |
| 5,568,077 | 10/1996 | Sato et al. | 327/199 |
| 5,572,557 | 11/1996 | Aoki | 375/376 |
| 5,574,698 | 11/1996 | Raad | 365/230.06 |
| 5,576,645 | 11/1996 | Farwell | 327/94 |
| 5,577,236 | 11/1996 | Johnson et al. | 395/551 |
| 5,578,940 | 11/1996 | Dillon et al. | 326/30 |
| 5,578,941 | 11/1996 | Sher et al. | 326/34 |
| 5,579,326 | 11/1996 | McClure | 371/61 |
| 5,581,197 | 12/1996 | Motley et al. | 326/30 |
| 5,589,788 | 12/1996 | Goto | 327/276 |
| 5,590,073 | 12/1996 | Arakawa et al. | 365/185.08 |
| 5,594,690 | 1/1997 | Rothenberger et al. | 365/189.01 |
| 5,614,855 | 3/1997 | Lee et al. | 327/158 |
| 5,619,473 | 4/1997 | Hotta | 365/238.5 |
| 5,621,340 | 4/1997 | Lee et al. | 327/65 |
| 5,621,690 | 4/1997 | Jungroth et al. | 365/200 |
| 5,621,739 | 4/1997 | Sine et al. | 371/22.1 |
| 5,627,780 | 5/1997 | Malhi | 365/185.09 |
| 5,627,791 | 5/1997 | Wright et al. | 365/222 |
| 5,631,872 | 5/1997 | Naritake et al. | 365/227 |
| 5,636,163 | 6/1997 | Furutani et al. | 365/189.01 |
| 5,636,173 | 6/1997 | Schaefer | 365/230.03 |
| 5,636,174 | 6/1997 | Rao | 365/230.03 |
| 5,638,335 | 6/1997 | Akiyama et al. | 365/230.03 |
| 5,657,481 | 8/1997 | Farmwald et al. | 395/551 |
| 5,668,763 | 9/1997 | Fujioka et al. | 365/200 |
| 5,692,165 | 11/1997 | Jeddeloh et al. | 395/551 |
| 5,694,065 | 12/1997 | Hamasaki et al. | 327/108 |
| 5,712,580 | 1/1998 | Baumgartner et al. | 327/12 |
| 5,719,508 | 2/1998 | Daly | 327/12 |
| 5,751,665 | 5/1998 | Tanoi | 368/120 |
| 5,789,947 | 8/1998 | Sato | 327/3 |
| 5,822,314 | 10/1998 | Chater-Lea | 370/337 |

FOREIGN PATENT DOCUMENTS

| | | |
|---|---|---|
| 0 655 834 A1 | 5/1995 | European Pat. Off. . |
| 0 680 049 A2 | 11/1995 | European Pat. Off. . |
| 0-7319577 | 12/1995 | European Pat. Off. . |
| 0 703 663 A1 | 3/1996 | European Pat. Off. . |
| 0 704 848 A3 | 4/1996 | European Pat. Off. . |
| 0 704 975 A1 | 4/1996 | European Pat. Off. . |
| 0 767 538 A1 | 4/1997 | European Pat. Off. . |
| 6-1237512 | 10/1986 | Japan . |
| 2-112317 | 4/1990 | Japan . |
| 4-135311 | 5/1992 | Japan . |
| 5-136664 | 6/1993 | Japan . |
| 5-282868 | 10/1993 | Japan . |
| WO 94/29871 | 12/1994 | WIPO . |
| WO 95/22200 | 8/1995 | WIPO . |
| WO 95/22206 | 8/1995 | WIPO . |
| WO 96/10866 | 4/1996 | WIPO . |
| WO 97/14289 | 4/1997 | WIPO . |
| WO 97/42557 | 11/1997 | WIPO . |

OTHER PUBLICATIONS

Arai, Y. et al., "A CMOS Four Channel x 1K Time Memory LSI with 1–ns/b Resolution", IEEE Journal of Solid–State Circuits, vol. 27, No. 3, M, 8107 Mar., 1992, No. 3, New York, US, pp. 359–364 and pp. 528–531.

Arai, Y. et al., "A Time Digitizer CMOS Gate–Array with a 250 ps Time Resolution", XP 000597207, IEEE Journal of Solid–State Circuits, vol. 31, No. 2, Feb. 1996, pp. 212–220.

Aviram, A. et al., "Obtaining High Speed Printing on Thermal Sensitive Special Paper with a Resistive Ribbon Print Head", IBM Technical Disclosure Bulletin, vol. 27, No. 5, Oct. 1984, pp. 3059–3060.

Bazes, M., "Two Novel Fully Complementary Self–Biased CMOS Differential Amplifiers", IEEE Journal of Solid––State Circuits, vol. 26, No. 2, Feb. 1991, pp. 165–168.

Chapman, J. et al., "A Low–Cost High–Performance CMOS Timing Vernier for ATE", IEEE International Test Conference, Paper 21.2, 1995, pp. 459–468.

Cho, J. "Digitally–Controlled PLL with Pulse Width Detection Mechanism for Error Correction", ISSCC 1997, Paper No. SA 20.3, pp. 334–335.

Christiansen, J., "An Integrated High Resolution CMOS Timing Generator Based on an Array of Delay Locked Loops", IEEE Journal of Solid–State Circuits, vol. 32, No. 7, Jul. 1996, pp. 952–957.

Combes, M. et al., "A Portable Clock Multiplier Generator Using Digital CMOS Standard Cells", IEEE Journal of Solid–State Circuits, vol. 31, No. 7, Jul. 1996, pp. 958–965.

Descriptive literature entitled, "400MHz SLDRAM, 4M X 16 SLDRAM Pipelined, Eight Bank, 2.5 V Operation," SLDRAM Consortium Advance Sheet, published throughout the United States, pp. 1–22.

Donnelly, K. et al., "A 660 MB/s Interface Megacell Portable Circuit in 0.3 $\mu$m–0.7 $\mu$m CMOS ASIC", IEEE Journal of Solid–State Circuits, vol. 31, No. 12, Dec. 1996, pp. 1995–2001.

"Draft Standard for a High–Speed Memory Interface (SyncLink)", Microprocessor and Microcomputer Standards Subcommittee of the IEEE Computer Society, Copyright 1996 by the Institute of Electrical and Electronics Engineers, Inc., New York, NY, pp. 1–56.

Goto, J. et al., "A PLL–Based Programmable Clock Generator with 50– to 350–MHz Oscillating Range for Video Signal Processors", IEICE Trans. Electron., vol. E77–C, No. 12, Dec. 1994, pp. 1951–1956.

Hamamoto, T., "400–MHz Random Column Operating SDRAM Techniques with Self–Skew Compensation", IEEE Journal of Solid–State Circuits, vol. 33, No. 5, May 1998, pp. 770–778.

Ishibashi, A. et al., "High–Speed Clock Distribution Architecture Employing PLL for 0.6 $\mu$m CMOS SOG", IEEE Custom Integrated Circuits Conference, 1992, pp. 27.6.1–27.6.4.

Kim, B. et al., "A 30MHz High–Speed Analog/Digital PLL in 2 $\mu$m CMOS", ISSCC, Feb. 1990.

Kikuchi, S. et al., "A Gate–Array–Based 666MHz VLSI Test System", IEEE International Test Conference, Paper 21.1, 1995, pp. 451–458.

Ko, U. et al., "A 30–ps Jitter, 3.6–$\mu$s Locking, 3.3–Volt Digital PLL for CMOS Gate Arrays", IEEE Custom Integrated Circuits Conference, 1993, pp. 23.3.1–23.3.4.

Lee, T. et al., "A 2.5V Delay–Locked Loop for an 18Mb 500 MB/s DRAM", IEEE International Solid–State Circuits Conference Digest of Technical Papers, Paper No. FA 18.6, 1994, pp. 300–301.

Lesmeister, G., "A Densely Integrated High Performance CMOS Tester", International Test Conference, Paper 16.2, 1991, pp. 426–429.

Ljuslin, C. et al., "An Integrated 16–channel CMOS Time to Digital Converter", IEEE Nuclear Science Symposium & Medical Imaging Conference Record, vol. 1, 1993, pp. 625–629.

Maneatis, J., "Low–Jitter Process–Independent DLL and PLL Based on Self–Biased Techniques", IEEE Journal of Solid–State Circuits, vol. 31, No. 11, Nov. 1996, pp. 1723–1732.

Nakamura, M. et al., "A 156 Mbps CMOS Clock Recovery Circuit for Burst–mode Transmission", Symposium on VLSI Circuits Digest of Technical Papers, 1996, pp. 122–123.

Nielson, E., "Inverting latches make simple VCO", EDN, Jun. 19, 1997.

Novof, I. et al., "Fully Integrated CMOS Phase–Locked Loop with 15 to 240 MHz Locking Range and ±50 ps Jitter", IEEE Journal of Solid–State Circuits, vol. 30, No. 11, Nov. 1995, pp. 1259–1266.

Santos, D. et al., "A CMOS Delay Locked Loop And Sub–Nanosecond Time–to–Digital Converter Chip", IEEE Nuclear Science Symposium and Medical Imaging Conference Record, vol. 1, Oct. 1995, pp. 289–291.

Saeki, T. et al., "A 2.5–ns Clock Access, 250–MHz, 256–Mb SDRAM with Synchronous Mirror Delay", IEEE Journal of Solid–State Circuits, vol. 31, No. 11, Nov. 1996, pp. 1656–1665.

Shirotori, T. et al., "PLL–based, Impedance Controlled Output Buffer", 1991 Symposium on VLSI Circuits Digest of Technical papers, pp. 49–50.

Sidiropoulos, S. et al., "A 700–Mb/s/pin CMOS Signaling Interface Using Current Integrating Receivers", IEEE Journal of Solid–State Circuits, vol. 32, No. 5, May 1997, pp. 681–690.

Sidiropoulos, S. et al., "A CMOS 500 Mbps/pin synchronous point to point link interface", IEEE Symposium on VLSI Circuits Digest of Technical Papers, 1994, pp. 43–44.

Sidiropoulos, S. et al., "A Semi–Digital DLL with Unlimited Phase Shift Capability and 0.08–400MHz Operating Range," IEEE International Solid State Circuits Conference, Feb. 8, 1997, pp. 332–333.

Soyuer, M. et al., "A Fully Monolithic 1.25GHz CMOS Frequency Synthesizer", IEEE Symposium on VLSI Circuits Digest of Technical Papers, 1994, pp. 127–128.

Taguchi, M. et al., "A 40–ns 64–Mb DRAM with 64–b Parallel Data Bus Architecture", IEEE Journal of Solid––State Circuits, vol. 26, No. 11, Nov. 1991, pp. 1493–1497.

Tanoi, S. et al., "A 250–622 MHz Deskew and Jitter–Suppressed Clock Buffer Using a Frequency– and Delay––Locked Two–Loop Architecture", 1995 Symposium on VLSI Circuits Digest of Technical Papers, vol. 11, No. 2, pp. 85–86.

Tanoi, S. et al., "A 250–622 MHz Deskew and Jitter–Suppressed Clock Buffer Using Two–Loop Architecture", IEEE IEICE Trans. Electron., vol. E–79–C. No. 7, Jul. 1996, pp. 898–904.

von Kaenel, V. et al., "A 320 MHz, 1.5 m W @ 1.35 V CMOS PLL for Microprocessor Clock Generation", IEEE Journal of Solid–State Circuits, vol. 31, No. 11, Nov. 1996, pp. 1715–1722.

Watson, R. et al., "Clock Buffer Chip with Absolute Delay Regulation Over Process and Environmental Variations", IEEE Custom Integrated Circuits Conference, 1992, pp. 25.2.1–25.2.5.

Yoshimura, T. et al. "A 622–Mb/s Bit/Frame Synchronizer for High–Speed Backplane Data Communication", IEEE Journal of Solid–State Circuits, vol. 31, No. 7, Jul. 1996, pp. 1063–1066.

METHOD AND APPARATUS FOR ADAPTIVELY ADJUSTING THE TIMING OFFSET BETWEEN A CLOCK SIGNAL AND DIGITAL SIGNALS TRANSMITTED COINCIDENT WITH THAT CLOCK SIGNAL, AND MEMORY DEVICE AND SYSTEM USING SAME

TECHNICAL FIELD

The present invention relates generally to integrated circuit devices, and more particularly to a system and process for adjusting the timing offset of digital signals applied coincident with an external clock signal so that the external clock signal can be used by an external device to latch the digital signal at the optimum time.

BACKGROUND OF THE INVENTION

Conventional computer systems include a processor (not shown) coupled to a variety of memory devices, including read-only memories ("ROMs") which traditionally store instructions for the processor, and a system memory to which the processor may write data and from which the processor may read data. The processor may also communicate with an external cache memory, which is generally a static random access memory ("SRAM"). The processor also communicates with input devices, output devices, and data storage devices.

Processors generally operate at a relatively high speed. Processors such as the Pentium® and Pentium II® microprocessors are currently available that operate at clock speeds of at least 400 MHz. However, the remaining components of existing computer systems with the exception of SRAM cache, are not capable of operating at the speed of the processor. For this reason the system memory devices, as well as the input devices, output devices, and data storage devices, are not coupled directly to the processor bus. Instead, the system memory devices are generally coupled to the processor bus through a memory controller, bus bridge or similar device, and the input devices, output devices, and data storage devices are coupled to the processor bus through a bus bridge. The memory controller allows the system memory devices to operate at a lower clock frequency that is substantially lower than the clock frequency of the processor. Similarly, the bus bridge allows the input devices, output devices, and data storage devices to operate at a substantially lower frequency. Currently, for example, a processor having a 300 MHz clock frequency may be mounted on a mother board having a 66 MHz clock frequency for controlling the system memory devices and other components.

Access to system memory is a frequent operation for the processor. The time required for the processor, operating, for example, at 300 MHz, to read data from or write data to a system memory device operating at, for example, 66 MHz, greatly slows the rate at which the processor is able to accomplish its operations. Thus, much effort has been devoted to increasing the operating speed of system memory devices.

System memory devices are generally dynamic random access memories ("DRAMs"). Initially, DRAMs were asynchronous and thus did not operate at even the clock speed of the motherboard. In fact, access to asynchronous DRAMs often required that wait states be generated to halt the processor until the DRAM had completed a memory transfer. However, the operating speed of asynchronous DRAMs was successfully increased through such innovations as burst and page mode DRAMs which did not require that an address be provided to the DRAM for each memory access. More recently, synchronous dynamic random access memories ("SDRAMs") have been developed to allow the pipelined transfer of data at the clock speed of the motherboard. However, even SDRAMs are incapable of operating at the clock speed of currently available processors. Thus, SDRAMs cannot be connected directly to the processor bus, but instead must interface with the processor bus through a memory controller, bus bridge, or similar device. The disparity between the operating speed of the processor and the operating speed of SDRAMs continues to limit the speed at which processors may complete operations requiring access to system memory.

A solution to this operating speed disparity has been proposed in the form of a computer architecture known as a synchronous link architecture. In the synchronous link architecture, the system memory may be coupled to the processor either directly through the processor bus or through a memory controller. Rather than requiring that separate address and control signals be provided to the system memory, synchronous link memory devices receive command packets that include both control and address information. The synchronous link memory device then outputs or receives data on a data bus that may be coupled directly to the data bus portion of the processor bus.

An example of a computer system 10 using the synchronous link architecture is shown in FIG. 1. The computer system 10 includes a processor 12 having a processor bus 14 coupled through a memory controller 18 and system memory bus 23 to three packetized or synchronous link dynamic random access memory ("SLDRAM") devices 16a–c. The computer system 10 also includes one or more input devices 20, such as a keypad or a mouse, coupled to the processor 12 through a bus bridge 22 and an expansion bus 24, such as an industry standard architecture ("ISA") bus or a peripheral component interconnect ("PCI") bus. The input devices 20 allow an operator or an electronic device to input data to the computer system 10. One or more output devices 30 are coupled to the processor 12 to display or otherwise output data generated by the processor 12. The output devices 30 are coupled to the processor 12 through the expansion bus 24, bus bridge 22 and processor bus 14. Examples of output devices 24 include printers and a video display units. One or more data storage devices 38 are coupled to the processor 12 through the processor bus 14, bus bridge 22, and expansion bus 24 to store data in or retrieve data from storage media (not shown). Examples of storage devices 38 and storage media include fixed disk drives floppy disk drives, tape cassettes and compact-disk read-only memory drives.

In operation, the processor 12 sends a data transfer command via the processor bus 14 to the memory controller 18, which, in turn, communicates with the memory devices 16a–c via the system memory bus 23 by sending the memory devices 16a–c command packets that contain both control and address information. Data is coupled between the memory controller 18 and the memory devices 16a–c through a data bus portion of the system memory bus 23. During a read operation, data is transferred from the SLDRAMs 16a–c over the memory bus 23 to the memory controller 18 which, in turn, transfers the data over the processor 14 to the processor 12. The processor 12 transfers write data over the processor bus 14 to the memory controller 18 which, in turn, transfers the write data over the system memory bus 23 to the SLDRAMs 16a–c. Although all the memory devices 16a–c are coupled to the same conductors of the system memory bus 23, only one memory device 16a–c at a time reads or writes data. thus avoiding bus contention on the memory bus 23. Bus contention is avoided by each of the memory devices 16a–c on the system memory 22 having a unique identifier, and the command packet contains an identifying code that selects only one of these components.

The computer system 10 also includes a number of other components and signal lines that have been omitted from FIG. 1 in the interests of brevity. For example, as explained below, the memory devices 16a–c also receive a master clock signal to provide internal timing signals, a data clock signal clocking data into and out of the memory device 16. and a FLAG signal signifying the start of a command packet.

A typical command packet CA<0:39> for an SLDRAM is shown in FIG. 2 and is formed by 4 packet words CA<0:9>, each of which contains 10 bits of data. As will be explained in more detail below, each packet word CA<0:9> is applied on a command-address bus CA including 10 lines CA0–CA9. In FIG. 2, the four packet words CA<0:9> comprising a command packet CA<0:39> are designated PW1–PW4. The first packet word $PW_1$ contains 7 bits of data identifying the packetized DRAM 16a–c that is the intended recipient of the command packet. As explained below, each of the packetized DRAMs is provided with a unique ID code that is compared to the 7 ID bits in the first packet word $PW_1$. Thus, although all of the packetized DRAMs 16a–c will receive the command packet, only the packetized DRAM 16a–c having an ID code that matches the 7 ID bits of the first packet word $PW_1$ will respond to the command packet.

The remaining 3 bits of the first packet word $PW_1$ as well as 3 bits of the second packet word $PW_2$ comprise a 6 bit command. Typical commands are read and write in a variety of modes, such as accesses to pages or banks of memory cells. The remaining 7 bits of the second packet word $PW_2$ and portions of the third and fourth packet words $PW_3$ and $PW_4$ comprise a 20 bit address specifying a bank, row and column address for a memory transfer or the start of a multiple bit memory transfer. In one embodiment, the 20-bit address is divided into 3 bits of bank address, 10 bits of row address, and 7 bits of column address. Although the command packet shown in FIG. 2 is composed of 4 packet words PW1–PW4 each containing up to 10 bits, it will be understood that a command packet may contain a lesser or greater number of packet words, and each packet word may contain a lesser or greater number of bits.

The memory device 16a is shown in block diagram form in FIG. 3. Each of the memory devices 16a–c includes a clock generator circuit 40 that receives a command clock signal CCLK and generates a large number of other clock and timing signals to control the timing of various operations in the memory device 16a. The memory device 16a also includes a command buffer 46 and an address capture circuit 48 which receive an internal clock signal ICLK a command packet CA<0:9> on a 10 bit command-address bus CA, and a terminal 52 receiving a FLAG signal. A memory controller (not shown) or other device normally transmits the command packet CA<0:9> to the memory device 16a in synchronism with the command clock signal CCLK. As explained above, the command packet CA<0:39>, which generally includes four 10-bit packet words PW1–PW4, contains control and address information for each memory transfer. The FLAG signal identifies the start of a command packet, and also signals the start of an initialization sequence. The command buffer 46 receives the command packet from the command-address bus CA, and compares at least a portion of the command packet to identifying data from an ID register 56 to determine if the command packet is directed to the memory device 16a or some other memory device 16b, c. If the command buffer 46 determines that the command is directed to the memory device 16a, it then provides the command to a command decoder and sequencer 60. The command decoder and sequencer 60 generates a large number of internal control signals to control the operation of the memory device 16a during a memory transfer.

The address capture circuit 48 also receives the command packet from the command-address bus CA and outputs a 20-bit address corresponding to the address information in the command packet. The address is provided to an address sequencer 64, which generates a corresponding 3-bit bank address on bus 66, a 10-bit row address on bus 68, and a 7-bit column address on bus 70. The row and column addresses are processed by row and column address paths, as will be described in more detail below.

One of the problems of conventional DRAMs is their relatively low speed resulting from the time required to precharge and equilibrate circuitry in the DRAM array. The SLDRAM 16a shown in FIG. 3 largely avoids this problem by using a plurality of memory banks 80, in this case eight memory banks 80a–h. After a read from one bank 80a, the bank 80a can be precharged while the remaining banks 80b–h are being accessed. Each of the memory banks 80a–h receives a row address from a respective row latch/decoder/driver 82a–h. All of the row latch/decoder/drivers 82a–h receive the same row address from a predecoder 84 which, in turn, receives a row address from either a row address register 86 or a refresh counter 88 as determined by a multiplexer 90. However, only one of the row latch/decoder/drivers 82a–h is active at any one time as determined by bank control logic 94 as a function of a bank address from a bank address register 96.

The column address on bus 70 is applied to a column latch/decoder 100, which supplies I/O gating signals to an I/O gating circuit 102. The I/O gating circuit 102 interfaces with columns of the memory banks 80a–h through sense amplifiers 104. Data is coupled to or from the memory banks 80a–h through the sense amps 104 and I/O gating circuit 102 to a data path subsystem 108 which includes a read data path 110 and a write data path 112. The read data path 110 includes a read latch 120 that stores data from the I/O gating circuit 102.

In the memory device 16a shown in FIG. 3, 64 bits of data are stored in the read latch 120. The read latch then provides four 16-bit data words to an output multiplexer 122 that sequentially supplies each of the 16-bit data words to a read FIFO buffer 124. Successive 16-bit data words are clocked through the read FIFO buffer 124 in response to a clock signal RCLK generated by the clock generator 40. The FIFO buffer 124 sequentially applies the 16-bit data words to a driver circuit 128 which, in turn, applies the 16-bit data words to a data bus DQ forming part of the processor bus 14 (see FIG. 1). The FIFO buffer 124 also applies two data clock signals DCLK0 and DCLK1 to the driver circuit 128 which, in turn, applies the data clock signals DCLK0 and DCLK1 on respective data clock lines 132 and 133. The data clocks DCLK0 and DCLK1 enable a device, such as the memory controller 18, reading data on the data bus DQ to be synchronized with the data. Particular bits in the command portion of the command packet CA0–CA9 determine which of the two data clocks DCLK0 and DCLK1 is applied by the driver circuit 128. It should be noted that the data clocks DCLK0 and DCLK1 are differential clock signals, each including true and complementary signals, but for ease of explanation, only one signal for each clock is illustrated and described.

The write data path 112 includes a receiver buffer 140 coupled to the data bus 130. The receiver buffer 140 sequentially applies 16-bit data words from the data bus DQ to four input registers 142, each of which is selectively enabled by a signal from a clock generator circuit 144. The clock generator circuit 144 generates these enable signals responsive to the selected one of the data clock signals DCLK0 and DCLK1. The memory controller or processor determines which data clock DCLK0 or DCLK1 will be utilized during a write operation using the command portion of a command packet applied to the memory device 16a. As with the command clock signal CCLK and command packet, the memory controller or other device (not shown) normally transmits the data to the memory device 16a in synchronism with the selected one of the data clock signals DCLK0 and DCLK1. The clock generator 144 is programmed during initialization to adjust the timing of the clock signal applied to the input registers 142 relative to the selected one of the data clock signals DCLK0 and DCLK1 so that the input registers 142 can capture the write data at the proper times. In response to the selected data clock DCLK0 or DCLK1, the input registers 142 sequentially store four 16-bit data words and combine them into one 64-bit data word applied to a write FIFO buffer 148. The write FIFO buffer 148 is clocked by a signal from the clock generator 144 and an internal write clock WCLK to sequentially apply 64-bit write data to a write latch and driver 150. The write latch and driver 150 applies the 64-bit write data to one of the memory banks 80a–h through the I/O gating circuit 102 and the sense amplifiers 104.

As mentioned above, an important goal of the synchronous link architecture is to allow data transfer between a processor or memory controller and a memory device to occur at a significantly faster rate. However, as the rate of data transfer increases, it becomes more difficult to maintain synchronization of signals transmitted between the memory controller 18 and the memory device 16a. For example, as mentioned above, the command packet CA<0:39> is normally transmitted from the memory controller 18 to the memory device 16a in synchronism with the command clock signal CCLK. and the read and write data are normally transferred between the memory controller 18 and the memory device 16a in synchronism with the selected one of the data clock signals DCLK0 and DCLK1. However, because of unequal signal delays and other factors, the command packet CA<0:39> may not arrive at the memory device 16a in synchronism with the command clock signal CCLK, and write and read data may not arrive at the memory device 16a and memory controller 18, respectively, in synchronism with the selected one of the data clock signals DCLK0 and DCLK1. Moreover, even if these signals are actually coupled to the memory device 16a and memory controller 18 in synchronism with each other, they may loose synchronism once they are coupled to circuits within these respective devices. For example, internal signals require time to propagate to various circuitry in the memory device 16a, differences in the lengths of signal routes can cause differences in the times at which signals reach the circuitry, and differences in capacitive loading of signal lines can also cause differences in the times at which signals reach the circuitry. These differences in arrival times can become significant at high speeds of operation and eventually limit the operating speed of the memory devices 16a and memory controller 18.

The problems associated with varying arrival times are exacerbated as timing tolerances become more restricted with higher data transfer rates. For example, if the internal clock ICLK derived from the command clock CCLK does not latch each of the packet words CA<0:9> comprising a command packet CA<0:39> at the proper time, errors in the operation of the memory device may result. Similarly, data errors may result during write operations if internal signals developed responsive to the data clocks DCLK0 and DCLK1 do not latch data applied on the data bus DQ at the proper time. During read operations, data errors may likewise result if internal signals in the memory controller 18 developed responsive to the data clock signals DCLK0 and DCLK1 from the memory device 16a do not latch read data applied on the data bus DQ at the proper time. Moreover, even if these respective clocks are initially synchronized, this synchronism may be lost over time during normal operation of the memory device 16a. Loss in synchronism may result from a variety of factors, including temperature variations in the environment in which the memory device 16a is operating, variations in the supply voltage applied to the memory device, or drift in operating parameters of components within the memory device.

One skilled in the art will understand that synchronization of the clock signal CCLK, DCLK0, and DCLK1 is being used up to this point to mean the adjusting of the timing of respective internal clock signals derived from these respective external clock signals so the internal clock signals can be used to latch corresponding digital signals at optimum times. For example. the command clock signal CCLK is synchronized when the timing of the internal clock signal ICLK relative to the command clock signal CCLK causes packet Words CA<0:9> to be latched at the optimum time.

To synchronize the command clock signals CCLK and the data clock signals DCLK0 and DCLK1 during write data operations, the memory controller 18 (FIG. 1) places the memory device 16a in a command and write data synchronization mode by applying a 15 bit repeating pseudo-random bit pattern on each line of the command-address bus CA, data bus DQ. and on the FLAG line 52. One 15-bit pseudo-random bit pattern that may be utilized is "111101011001000." As understood by one skilled in the art, such a pseudo-random bit pattern functions as a data pattern and also simulates unwanted noise on the lines of busses CA and DQ and on the FLAG line. The memory device 16a must be synchronized to correctly capture this data pattern notwithstanding the presence of such simulated noise. Synchronization circuitry within the memory device 16a (not shown in FIG. 3) must detect this applied pseudo-random bit pattern, place the device in the synchronization mode, and thereafter generate the necessary control signals to control components within the memory device to synchronize the clock signals CCLK, DCLK0, and DCLK1 from the controller 18.

The data clock signals DCLK0 and DCLK1 must similarly be synchronized for read operations between the memory controller 18 and memory device 16a. To synchronize the data clock signals DCLK0 and DCLK1 for read operations, the memory controller 18 must first place the memory device 16a in a read synchronization mode of operation, causing the memory device 16a to generate the data clock signals DCLK0 and DCLK1 and apply the 15 bit pseudo-random bit sequence on the data bus DQ. The memory controller 18 must thereafter operate in the same way as the memory device 16a during the command and write data synchronization mode to synchronize the data clock signals DCLK0 and DCLK1. More specifically, the memory controller 18 must generate the necessary internal control signals responsive to the applied data clock signals DCLK0 and DCLK1 to control components within the memory controller 18 device to synchronize the data clock signals DCLK0 and DCLK1.

During the read synchronization mode, the memory controller 18 must synchronize the data clocks DCLK0 and DCLK1 from each of the memory devices 16*a–c* in the computer system 10, and must store corresponding adjustments for each of the memory devices 16*a–c* so that the memory controller 18 properly adjusts the applied data clock signals during subsequent read operations. In other words, when the memory controller 18 requests read data from a particular memory device 16*a–c*, it must thereafter adjust the applied DCLK0 and DCLK1 signals from that memory device by the previously determined amount to properly capture the read data. For example, when reading data from the memory device 16*a* the memory controller 18 must adjust the applied data clock signals DCLK0 and DCLK1 from the device 16*a* by a first amount previously determined for that device, while the data clock signals DCLK0 and DCLK1 from the memory device 16*b* must be adjusted by a second amount previously determined for the device 16*b* to accurately capture read data from that device. Thus, for each memory device 16 in the computer system 10. the memory controller 18 must store the corresponding adjustment of the DCLK0 and DCLK1 signals.

The computer system 10 (FIG. 1) may include hundreds of memory devices 16, and as the number memory devices increases the complexity of circuitry in the memory controller 18 to store and apply the proper adjustments to the respective DCLK0 and DCLK1 signals during read operations increases accordingly. For example, the controller 18 could include a look-up table storing the adjustments for each memory device 16 in the system 10, but such an approach may place too great a burden on the controller 18 in the form of increased circuit complexity and potential timing problems. One potential solution to this problem is having the memory controller 18 determine a single adjustment for all memory devices 16, but a single adjustment may not be possible in certain systems 10 and thus the utility of this approach is limited.

There is a need for synchronizing respective data clock signals generated by a potentially large number of packetized memory devices during the transfer of read data between such memory devices and a memory controller. Moreover, although the foregoing discussion is directed to synchronizing clock signals in packetized memory devices like SLDRAMs, similar problems exist in other types of integrated circuits as well, including other types of memory devices.

SUMMARY OF THE INVENTION

According to one aspect of the present invention, a method of adaptively adjusting the timing offset of a digital signal relative to a clock signal output substantially coincident with that digital signal enables a latch receiving the digital signal to store the digital signal responsive to the clock signal. The method comprises applying the digital signal to the latch, storing the digital signal in the latch responsive to the clock signal, and evaluating the stored digital signal to determine if the stored digital signal has an expected value. The timing offset of the digital signal relative to the clock signal is thereafter adjusted, and the digital signals corresponding to respective timing offsets are latched and evaluated to determine if the stored digital signal has its expected value at each timing offset. Thereafter, a final timing offset of the digital signal is selected from the ones of the timing offsets that cause the latch to store the digital signal having the expected value. The timing offset of the digital signal is then adjusted to the selected final timing offset.

According to another aspect of the present invention, a read synchronization circuit adaptively adjusts the timing offset of digital signals applied on respective signal terminals relative to an external clock signal applied on an external clock terminal substantially coincident with the digital signals. The timing offset is adjusted to enable an external device to latch the digital signals responsive to the external clock signal. A digital signal pattern generator generates predetermined synchronization digital signals responsive to an activation signal. A register and clocking circuit has an input coupled to the pattern generator, an output coupled to the signal terminals, and first and second internal clock terminals adapted to receive respective first and second internal clock signals. The register and clocking circuit clocks in the synchronization data signals from the pattern generator responsive to the first internal clock signal, and clocks the synchronization data signals onto the signal terminals responsive to the second internal clock signal. The register and clocking circuit also generates the external clock signal responsive to the first internal clock signal.

A clock control circuit controls the phase of the second internal clock signal relative to the first internal clock signal responsive to a phase command signal. A control circuit is coupled to the pattern generator, clock control circuit, and is further coupled to a control bus adapted to receive control signals. The control circuit operates responsive to a synchronization command applied on the control bus to activate the pattern generator and apply a phase command signal to the clock control circuit, and to adjust the value of the phase command signal responsive to subsequent synchronization command signals applied on the control bus.

The read synchronization circuit may be utilized in a packetized dynamic random access memory device, in a memory system including a memory controller coupled to one or more packetized memory devices, or in a computer system including a plurality of packetized dynamic random access memories each including the read synchronization circuit. In addition, the read synchronization circuit may be used in other types of integrated circuits where it is necessary to adjust the timing offset of digital signals output coincident with a clock signal so that an external device may successfully capture the digital signals responsive to the clock signal.

DETAILED DESCRIPTION OF THE INVENTION

Figure 4:
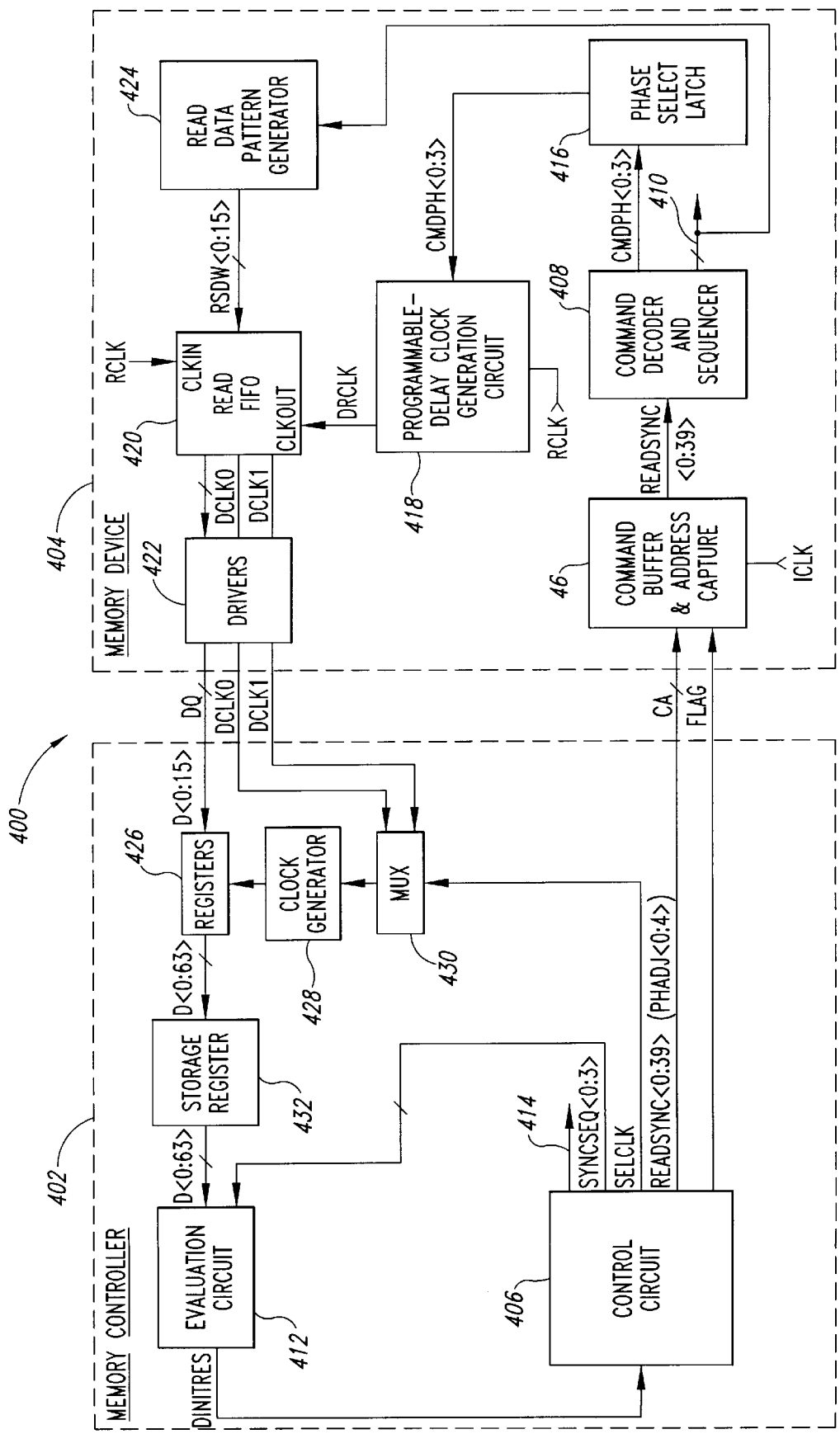
FIG. 4 is block diagram of a read synchronization system for a packetized memory device according to one embodiment of the present invention.

FIG. 4 is a functional block diagram of a read synchronization system 400 including portions of a memory controller 402 and packetized memory device 404 according to one embodiment of the present invention. The memory controller 402 applies command packets CA<0:39> and FLAG bits to the memory device 404 over the command-address bus CA and FLAG line. respectively, and receives data packet words D<0:15> on the data bus DQ and the data clocks DCLK0 and DCLK1 from the memory device 404 during read operations. In operation, the memory controller 402 places the memory device 404 in a read synchronization mode of operation and thereafter adjusts the timing offset of data packet words D<0:15> applied on the data bus relative to the data clock signals DCLK0 and DCLK1 to thereby synchronize the data clock signals during read operations, as will be explained in more detail below. One skilled in the art will understand that synchronization of the data clock signals DCLK0 and DCLK1 as described herein means the adjustment of the timing offset of data packet words D<0:15> on the data bus DQ relative to the data clock signals DCLK0 and DCLK1 such that the memory controller 402 can successfully capture the data packet words D<0:15> responsive to the data clock signals DCLK0 and DCLK1, as will be discussed in more detail below.

In the memory device 404, the command buffer and address capture circuit 46 (FIG. 3) latches packet words CA<0:9> and FLAG bits applied on the respective command-address bus CA and FLAG line as previously described with reference to FIG. 3. A command decoder and sequencer 408 receives the latched command packet CA<0:39> and FLAG bits from the command buffer and address capture circuit 46 and generates a plurality of control signals 410 to control the operation of components within the memory device 404 in response to the latched command packet CA<0:39> and FLAG signals. During the read synchronization mode of operation, the command decoder and sequencer 408 generates a phase command word CMDPH<0:3> in response to a read synchronization request packet READSYNC<0:39> applied on the command-address bus CA and latched by the command buffer and address capture circuit 46, as will be described in more detail below. A phase select latch 416 latches the phase command word CMDPH<0:3> generated by the command decoder and sequencer 408 and outputs the latched phase command word to a programmable-delay clock generation circuit 418. The programmable-delay clock generation circuit 418 generates a delayed read clock signal DRCLK in response to the read clock signal RCLK. The phase of the DRCLK signal relative to the RCLK signal is controlled by the applied phase command word CMDPH<0:3>. In the embodiment of FIG. 4, the programmable-delay clock generation circuit 418 generates the DRCLK signal having one of 16 phase shifts relative to the RCLK signal, each of these 16 phase shifts corresponding to a particular value of the 4-bit phase command word CMDPH<0:3>.

Figure 1:
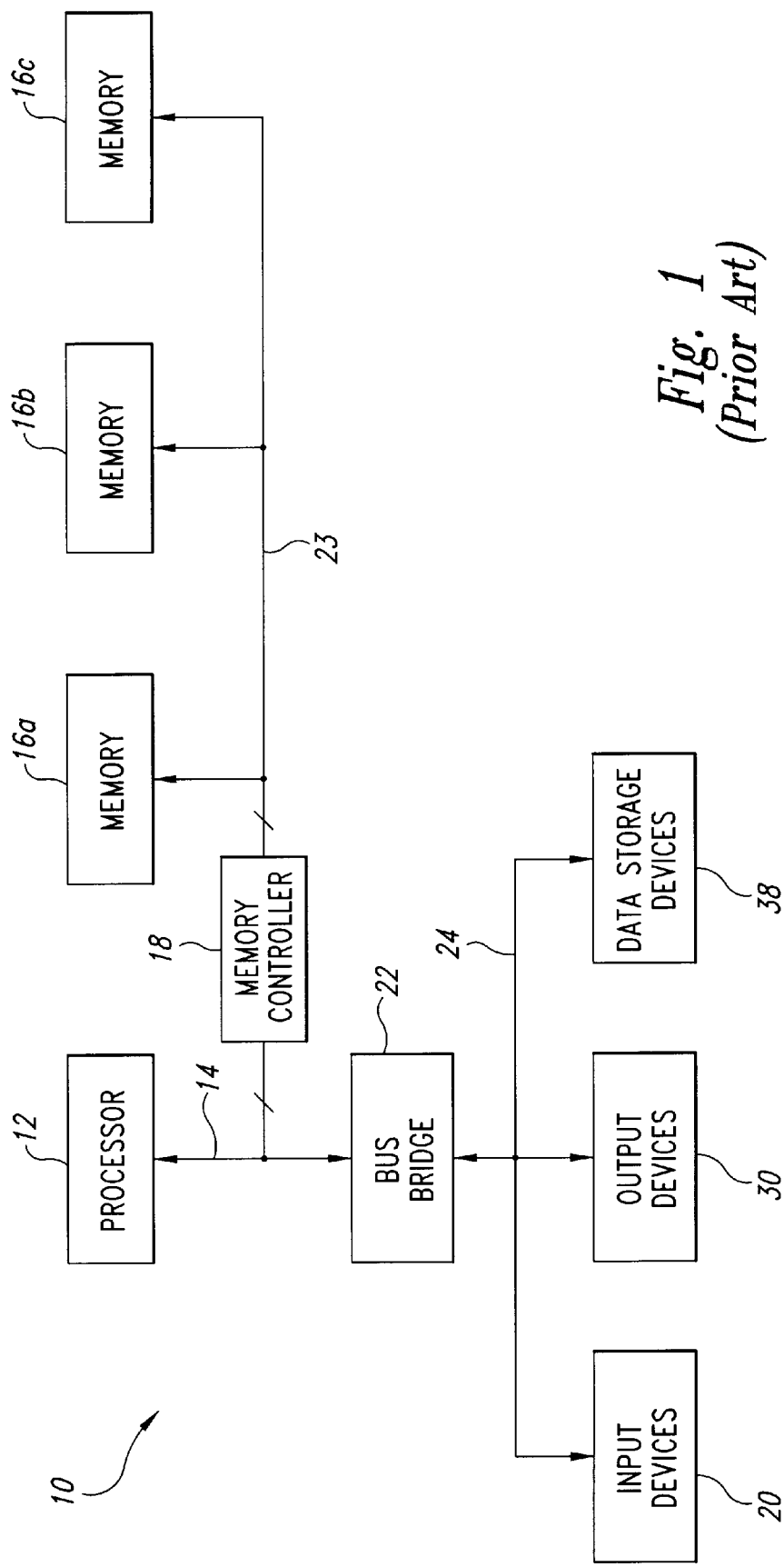
FIG. 1 is a block diagram of a conventional computer system including a plurality of packetized memory devices.
Figure 2:
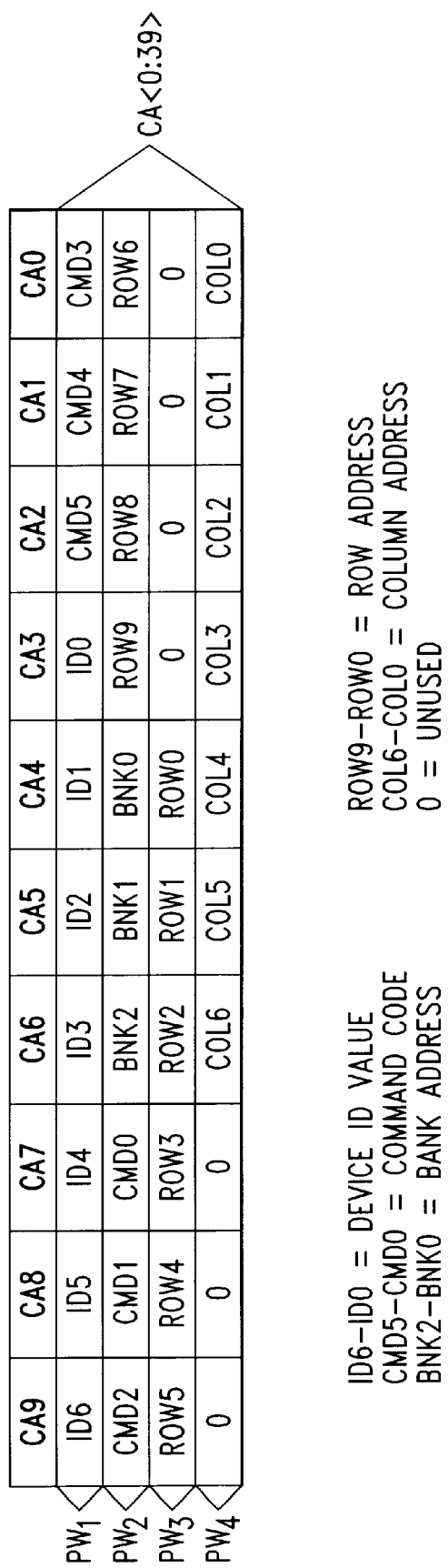
FIG. 2 is diagram showing a typical command packet received by the packetized memory devices of FIG. 1.
Figure 3:
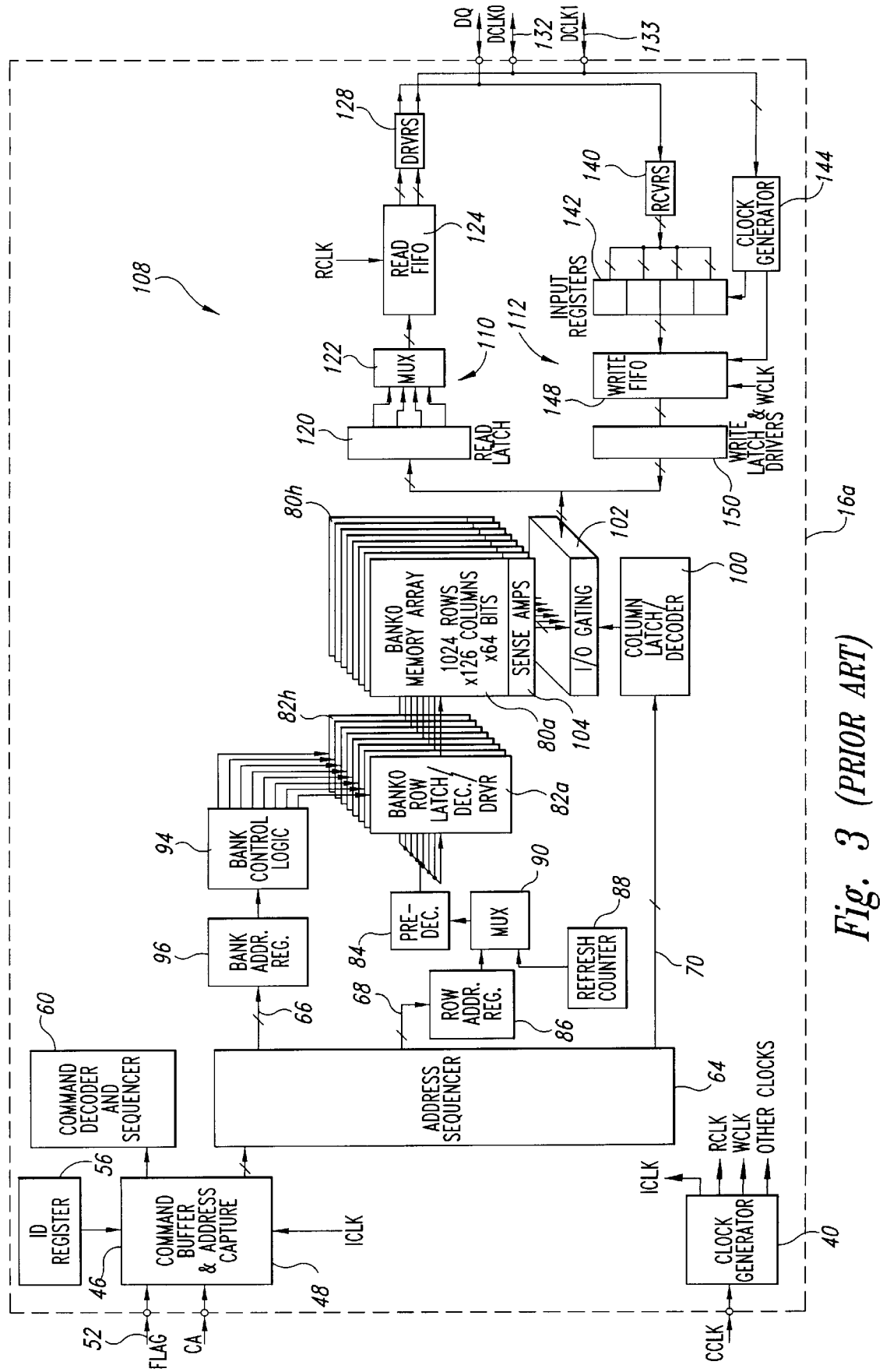
FIG. 3 is a block diagram of a conventional packetized memory device in the computer system of FIG. 1.

The memory device 404 further includes a read FIFO buffer 420 and read driver circuit 422 that are utilized in place of the read FIFO buffer 124 and driver circuit 128, respectively, of FIG. 3. A read data pattern generator 424 generates successive 16-bit read synchronization data packet words RSDW<0:15> that are clocked into the read FIFO buffer 420 in response to the RCLK signal, and are clocked out of the read FIFO buffer 420 in response to the DRCLK signal from the programmable-delay clock generation circuit 418. The read FIFO buffer 420 further generates the data clock signals DCLK0 and DCLK1 in response to the read clock signal RCLK. During the read synchronization mode of operation, the driver circuit 422 places successive read synchronization data words RSDW<0:15> clocked out of the read FIFO buffer 420 onto the data bus DQ as corresponding data packet words D<0:15>, and also outputs both the data clock signals DCLK0 and DCLK1 generated by the read FIFO buffer 420.

It should be noted that the read FIFO buffer 420 and driver circuit 422 also operate analogously to the corresponding circuits 124 and 128 of FIG. 3 during normal read operations of the memory device 404. In other words. during normal read operations the 16-bit data packet words successively output from the multiplexer 122 (FIG. 3) are clocked through the read FIFO buffer 420 responsive to the RCLK and DRCLK signals, and are transferred onto the data bus DQ by the driver circuit 422. In addition, during the normal read mode of operation the driver circuit 422 outputs the selected one of the data clock signals DCLK0 and DCLK1 determined by the read command packet applied to the memory device 404, as previously described.

The read data pattern generator 424 may generate a variety of data patterns, and in one embodiment the read data pattern generator 424 generates a 15-bit repeating pseudo-random bit sequence for each bit of the read synchronization data word RSDW<0:15>. One of the 15-bit pseudo-random bit sequences that may be generated by the read data pattern generator 424 is shown below in Table 1:

TABLE 1

| | | | | | | | | | | | | | | | |
|---|---|---|---|---|---|---|---|---|---|---|---|---|---|---|---|
| RSDW<0> (D<0>) | 1 | 1 | 1 | 1 | 0 | 1 | 0 | 1 | 1 | 0 | 0 | 1 | 0 | 0 | 0 |
| RSDW<1> (D<1>) | 0 | 0 | 0 | 0 | 1 | 0 | 1 | 0 | 0 | 1 | 1 | 0 | 1 | 1 | 1 |
| RSDW<2> (D<2>) | 1 | 1 | 1 | 1 | 0 | 1 | 0 | 1 | 1 | 0 | 0 | 1 | 0 | 0 | 0 |
| . | | | | | | | | | | | | | | | |
| . | | | | | | | | | | | | | | | |
| . | | | | | | | | | | | | | | | |
| RSDW<15> (D<15>) | 0 | 0 | 0 | 0 | 1 | 0 | 1 | 0 | 0 | 1 | 1 | 0 | 1 | 1 | 1 |

As seen in Table 1, the 15-bit pseudo-random bit sequence is complemented on adjacent bits of the read synchronization data word RSDW<0:15>. For example. the values for the bit RSDW<0> are the complement of the corresponding bits for the RSDW<1> bit as seen in Table 1. The 15 bit RSDW<0:15> words are sequentially clocked through the buffer 420 and then output by the driver circuit 422 as corresponding data initialization packet words D<0:15> on the data bus DQ, which is indicated in Table 1 by showing the bits RSDW<0>-RSDW<15> correspond to the bits D<0>-D<15>, respectively. In the following description the pattern generator 424 may be described as generating the data initialization packet words D<0:15> on the data bus DQ since these packet words correspond to the RSDW<0:15> words clocked through the buffer 426 and output by the drivers 422.

During the read synchronization mode of operation, data words D<0:15> applied on the data bus DQ by the memory device 404 are sequentially latched by input registers 426 contained in the memory controller 402. The input registers 426 sequentially latch four data packet words D<0:15> applied on the data bus DQ in response to a clock signal from a clock generator 428 and output these four latched data packet words as a 64-bit data word D<0:63>. A multiplexer 430 applies one of the data clock signals DCLK0 and DCLK1 to the clock generator 428, which generates its clock signal to latch data words D<0:15> into the registers 426 in response to the applied one of the data clock signals DCLK0 and DCLK1. A control circuit 406 applies a select clock signal SELCLK to the multiplexer 430 to control which data clock signal DCLK0 or DCLK1 is applied to the clock generator 428. When the SELCLK signal is active, the multiplexer 430 applies the DCLK0 signal to the clock generator 428 which, in turn, clocks the registers 426 in response to the applied DCLK0 signal. When the SELCLK signal is inactive the multiplexer 430 applies the DCLK1 signal to the clock generator 428, which, in turn. clocks the registers 426 in response to the applied DCLK1 signal.

A storage register 432 latches the 64-bit data word D<0:63> from the registers 426 under control of the control circuit 406. The storage register 432 outputs the latched data word D<0:63> to an evaluation circuit 412 which further receives an expected data or synchronization sequence word SYNCSEQ<0:3> generated by the control circuit 406. The evaluation circuit 412 compares the data word D<0:63> output by the storage register 432 to the synchronization sequence word SYNCSEQ<0:3> generated by the control circuit 406, and develops a data initialization results signal DINITRES in response to this comparison. The synchronization sequence word SYNCSEQ<0:3> generated by the control circuit 406 corresponds to the expected values for the bits in the data word D<0:63> output from the storage register 432. as will be described in more detail below. When the bits of the data word D<0:63> have their expected values determined by the SYNCSEQ<0:3> word. the evaluation circuit 412 drives the DINITRES signal active high, indicating the data packet DQ<0:63> was successfully captured. In contrast, when at least one of the bits in the data word D<0:63> does not have its expected value determined by the SYNCSEQ<0:3> word, the evaluation circuit 412 drives the DINITRES signal inactive low, indicating the data packet DQ<0:63> was unsuccessfully captured. The control circuit 406 receives the DINITRES signal from the evaluation circuit 412 and utilizes that signal in synchronizing the data clock signals DCLK0 and DCLK1, as will be explained in more detail below. Furthermore, the control circuit 406 generates a number of control signals 414 to control the evaluation circuit 412, storage register 432, and other components in the memory controller 402, and also applies command packets on the command-address bus CA and FLAG bits to the memory device 404 during the read synchronization mode of operation, as will be explained in more detail below.

The overall operation of the read synchronization system 400 in synchronizing the data clock signals DCLK0 and DCLK1 during the read synchronization mode of operation will now be described in more detail. The control circuit 406, or other circuitry (not shown in FIG. 4) within the memory controller 402 places the memory controller in the read synchronization mode of operation in response to a predetermined condition. For example, the memory controller 402 may operate in the read synchronization mode of operation as part of an initialization and synchronization procedure during which the memory controller 402 also synchronizes the command clock signal CCLK and the data clock signals DCLK0 and DCLK1 during write operations, and further performs other functions in initializing the memory device 404. Alternatively, the control circuit 406 may place the memory controller 402 in the read synchronization mode of operation after a predetermined time during normal operation of the memory controller 402 and memory device 404 in order to resynchronize the data clock signals DCLK0 and DCLK1.

After commencing operation in the read synchronization mode of operation, the control circuit 406 applies a read synchronization request packet READSYNC<0:39> on the command-address bus CA and the corresponding FLAG signals on the FLAG line. The read synchronization request packet READSYNC<0:39> is one of a plurality of event request packets the memory controller 402 may apply to the memory device 404, each even request packet corresponding to a command not requiring a specific address location within the memory device 404. Typical event request packets may include, in addition to the read synchronization request, commands to close all open rows in the memory arrays 80 (FIG. 3) adjust output voltage levels developed by the memory device 404, or to enter or exit a self-refresh mode of operation. The read synchronization request pack READSYNC<0:39> includes identification bits enabling the memory device 404 to determine whether the read synchronization request packet is directed to that particular memory device or some other memory device (not shown in FIG. 4). In addition, the read synchronization request packet READSYNC<0:39> includes command bits corresponding to a read synchronization command, and also includes a plurality of adjustment bits which are indicated as a phase adjustment word PHADJ<0:4> in FIG. 4. The phase adjustment word PHADJ<0:4> portion of the READSYN<0:39> packet is utilized by the memory device 404 to adjust the phase command word CMDPH<0:3> applied to the clock generation circuit 418 and thereby adjust the timing offset between data packet words D<0:15> placed on the data bus DQ and transitions of the data clock signals DCLK0 and DCLK1. as will be explained in more detail below.

The command buffer and address capture circuit 46 latches the applied read synchronization request packet READSYNC<0:39> and corresponding FLAG bits in response to the ICLK signal as previously described with reference to FIG. 3, and outputs the latched READSYNC<0:39> packet to the command decoder and sequencer 408. The command decoder and sequencer 408 decodes the command portion of the applied READSYNC<0:15>packet and thereafter generates the control signals 410 placing the memory device 404 in the read synchronization mode of operation. In response to the control signals 410, the read data pattern generator 424 begins sequentially applying the read synchronization data words RSDW<0:15> to the read FIFO buffer 420. The command decoder and sequencer 408 also generates the phase command word CMDPH<0:3> in response to the phase adjustment word PHADJ<0:4> portion of the received READSYNC<0:39> packet. The value of the generated phase command word CMDPH<0:3> is determined by the value of the phase adjustment word PHADJ<0:4>, and in this way the control circuit 406 in the memory controller 402 controls the value of the phase command word CMDPH<0:3>. The phase command word CMDPH<0:3> is latched by the phase select latch 416 and applied to the programmable-delay clock generation circuit 418. The clock generation circuit 418 thereafter generates the DRCLK signal having a phase relative to the RCLK signal determined by the applied CMDPH<0:3> word.

At this point, the read synchronization data wNords RSDW<0:15> generated by the pattern generator 424 are clocked into the read FIFO buffer in response to the RCLK signal, and are clocked out of the read FIFO buffer 420 in response to the DRCLK signal having a phase relative to the RCLK signal determined by the current value of the phase command word CMDPH<0:3>. The read synchronization data words RSDW<0:15> are thus clocked out of the read FIFO buffer 420 having a timing offset relative to the data clock signals DCLK0 and DCLK1 where the amount of this timing offset is determined by the value of the CMDPH<0:3> word applied to the clock generation circuit 418. The drivers 422 thereafter operate as previously described, applying the data clock signals DCLK0, DCLK1 and data initialization packet words D<0:15> to the memory controller 402.

At this point, the control circuit 406 drives the select clock signal SELCLK active causing the multiplexer 430 to apply the data clock signal DCLK0 to the clock generator 428. The D<0:15> words sequentially applied on the data bus DQ by the drivers 422 are then clocked into the registers 426 in response to the clock signal from the clock generator 428 developed in response to the data clock signal DCLK0. The registers 426 latch four data initialization packet words D<0:15>, which correspond to a single data packet DQ0<0:63>, and output this latched data packet as the data word D<0:63> to the storage register 432. The storage register 432 latches and outputs the data word D<0:63> to the evaluation circuit 412, which also receives the synchronization sequence word SYNCSEQ<0:3> from the control circuit 406 corresponding to the expected values for the bits in the data word D<0:63>.

The control circuit 406 may generate the SYNCSEQ<0:3> word through conventional pattern recognition circuitry (not shown in FIG. 4) which, upon entering the read synchronization mode of operation, generates the predetermined sequence of values defined by the 15-bit pseudo-random bit sequence generated by the pattern generator 424 In other words, referring back to Table 1, the pseudo-random bit sequence starts with 1111 for the bit D<0> and the next four values for the D<0> bit generated by the pattern generator 424, which should be sequentially captured by the registers 426, are 0101, followed by 1001, and so on. Thus, upon entering the read synchronization mode of operation, the control circuit 406 merely starts generating the expected values 0101, 1001, and so on for the SYNCSEQ<0:3> word. One skilled in the art will understand circuitry that may be utilized to develop the predetermined sequence of the SYNCSEQ<0:3> words generated by the control circuit 406, such as a state machine formed from appropriate logic circuitry. Alternatively, the pattern generator may be a generator utilizing a "seed" pattern captured on one of the bits of the data bus DQ as described in pending U.S. patent application Ser. No. XX/XXX to Manning, entitled "METHOD AND APPARATUS FOR GENERATING EXPECT DATA FROM A CAPTURED BIT PATTERN, AND MEMORY DEVICE USING SAME," filed Sep. 3, 1998, which is incorporated herein by reference.

At this point, the evaluation circuit 412 compares the applied data word D<0:63> to the expected data determined by the SYNCSEQ<0:3> word output from the control circuit 406, and develops the data initialization results signal DINITRES in response to this comparison. As previously described, when each of the bits in the data word D<0:63> has its expected value determined by the SYNCSEQ<0:63> word, the evaluation circuit 412 drives the DINITRES signal high. In contrast, when any of the bits in the data word D<0:63> does not have its expected value determined by the SYNCSEQ<0:3> word, the evaluation circuit 412 drives the DINITRES signal inactive low.

The control circuit 406 stores the value of the DINITRES signal output by the evaluation circuit 412, and thereafter generates a second read synchronization request packet READSYNC<0:3> including an incremented phase adjustment word PHADJ<0:4>. The control circuit 406 applies this new READSYNC<0:3> packet to the memory device 404, and this packet is once again latched by the command buffer and address capture circuit 46 and applied to the command decoder and sequencer 408. In response to the incremented PHADJ<0:4> word in this new READSYNC<0:39> packet, the command decoder and sequencer 408 increments the phase command word CMDPH<0:3> by an amount corresponding to the incremented value of the PHADJ<0:4> word portion of this new read synchronization packet. This new phase command word CMDPH<0:3> is again latched by the phase select latch 416 and applied to the clock generation circuit 418 which, in turn, now generates the DRCLK signal having a phase relative to the RCLK signal determined by the new value for the CMDPH<0:3> word. At this point, the read synchronization data words RSDW<0:15> generated by the pattern generator 424 are now clocked out of the read FIFO buffer 420 having a timing offset relative to the data clock signals DCLK0, DCLK1 determined by the new value of the phase command word CMDPH<0:3>. The drivers 422 apply the RSDW<0:15> words clocked out of the buffer 420 as the data initialization packet words D<0:15> on the data bus DQ, each data initialization packet word (D<0:15) having this new timing offset relative to the data clock signals DCLK0 DCLK1.

Figure 5:
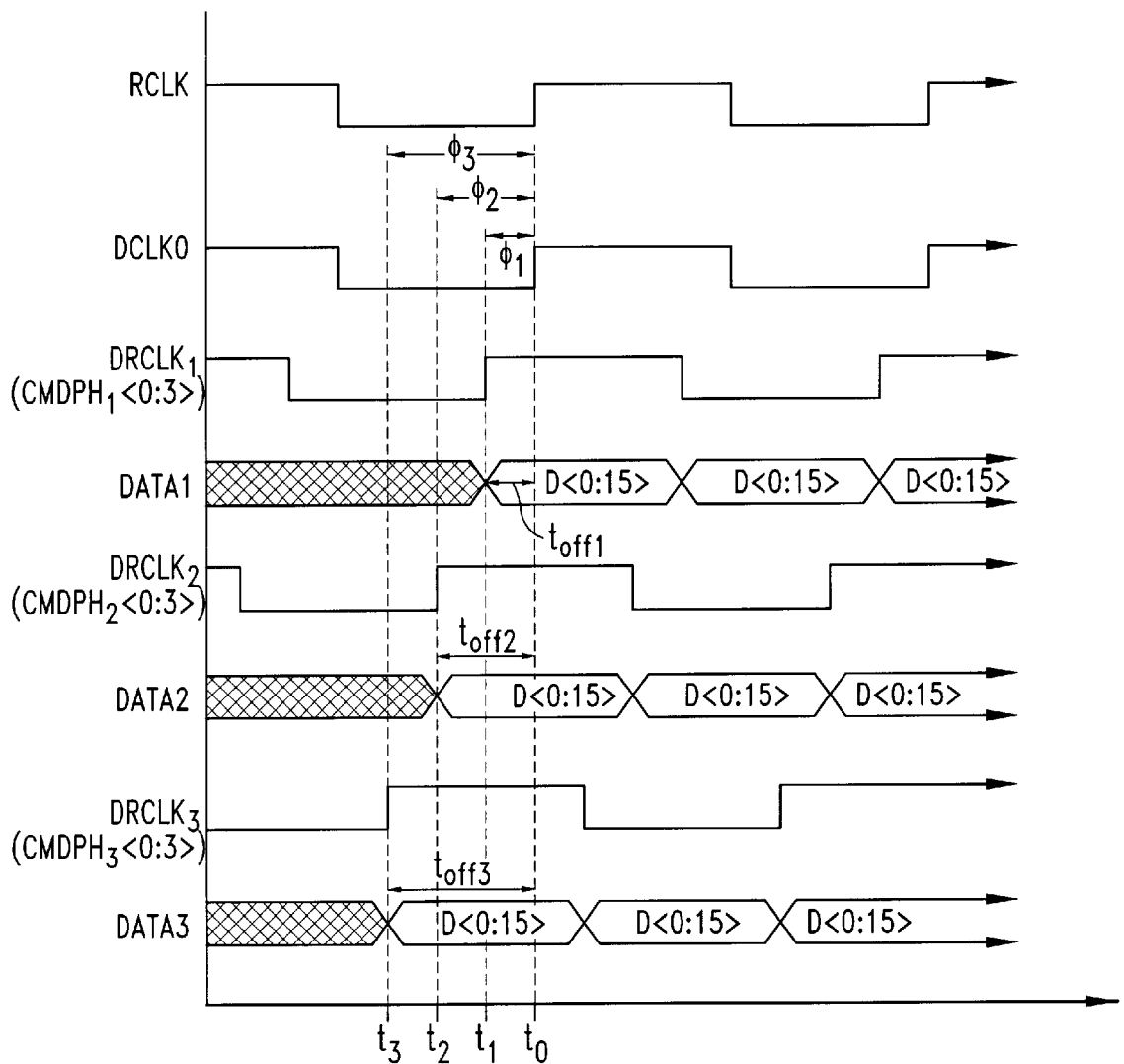
FIG. 5 is a timing diagram illustrating several timing offsets of data packets output from the read FIFO buffer in the memory device of FIG. 4.

FIG. 5 is a signal timing diagram that will be utilized to better explain the relationship between the phase shift of the DRCLK signal relative to the RCLK signal corresponding to the CMDPH<0:3> word, and the corresponding timing offset of data packet words D<0:15> applied on the data bus DQ. In the example of FIG. 5 the DCLK0 signal, which is generated by the read FIFO buffer 420 in response to the RCLK signal, has the same phase as the RCLK signal. FIG. 5 illustrates three different delayed read clock signals DRCLK$_1$, DRCLK$_2$, and DRCLK$_3$ corresponding to respective values CMDPH$_1$<0:3>, CMDPH$_2$<0:3>, and CMDPH$_3$<0:3> of the phase command word. As shown, the DRCLK$_1$, has a phase shift $\phi_1$ relative to the DCLK0 signal. When the DRCLK$_1$ signal goes high at a time $t_1$, corresponding data packet words D<0:15> designated DATA1 are placed on the data bus DQ and have a timing offset $t_{off1}$ relative to the rising edge of DCLK0 signal at a time $t_0$. As previously discussed, the data DATA1 is offset by the time $t_{off1}$ in an attempt to enable the memory controller 402 to successfully latch the data in response to the DCLK0 signal.

In the second example of FIG. 5. the DRCLK$_2$ signal corresponding to the CMDPH$_2$<0:3> word has a phase shift $\phi_2$ relative to the DCLK0 signal, and the corresponding data DATA2 has a timing offset $t_{off2}$ relative to the rising edge of the DCLK0 signal at the time $t_0$. Thus, in this example the data DATA2 is applied on the data bus DQ at a time $t_2$ before the rising edge of the DCLK0 signal at the time $t_0$. The third example illustrates the DRCLK$_3$ signal having a phase shift $\phi_3$ relative to the DCLK0 signal, and the corresponding data DATA3 has a timing offset t$_{off3}$ relative to the rising edge of the DCLK0 signal at the time t$_0$. In this example, the data DATA3 is applied on the data bus DQ at a time t$_3$ before the rising edge of the DCLK0 signal at the time t$_0$. As illustrated by these examples. the phase command word CMDPH<0:3> may be adjusted to thereby vary the phase shift of the DRCLK signal relative to the DCLK0 signal. As the phase shift of the DRCLK signal is adjusted relative to the DCLK0 signal, the timing offset of data packet words D<0:15> applied on the data bus DQ relative to transitions of the DCLK0 signal is adjusted by an amount corresponding to the adjusted phase shift.

Referring back to FIG. 4, the registers 426 once again capture the data initialization packet words D<0:15> having the new timing offset applied on the data bus DQ, and outputs four consecutive latched words as the data word D<0:63>. The storage register 432 latches this new data word D<0:63> from the registers 426 and outputs this new latched data word to the evaluation circuit 412. At this point, the control circuit 406 applies a new SYNCSEQ<0:3> word to the evaluation circuit 412 having a value corresponding to the expected data of the new data word D<0:63>. The evaluation circuit 412 thereafter operates as previously described, driving the DINITRES signal active high when each of the bits in the new data word D<0:63> has its expected value determined by the new SYNCSEQ<0:3> word, and driving the DINITRES signal inactive low when any of the bits in the data word D<0:63> does not have its expected value. The DINITRES signal generated by the evaluation circuit 412 in response to the new D<0:63> and SYNCSEQ<0:3> words is once again stored by the control circuit 406.

The control circuit 406 continues incrementing the phase adjustment word PHADJ<0:4> and applying read synchronization request packets READSYNC<0:39> including these incremented PHADJ<0:4> words to the memory device 404 to adjust the timing offset of the data initialization packet words D<0:15> applied on the data bus DQ relative to the data clock signals DCLK0, DCLK1. As the control circuit 406 increments the PHADJ<0:4> word, the control circuit stores a number of values for the DINITRES signal, each value corresponding to a particular value of the phase adjustment word PHADJ<0:4> (i.e., a particular timing offset of the D<0:15> words placed on the data bus DQ relative to the DCLK0 and DCLK1 signals). After a predetermined number of values for the DINITRES signal have been stored, the control circuit 406 executes a phase selection procedure to select a final phase adjustment word PHADJ<0:4> from among the phase adjustment words that resulted in the successful capture of the data packets D<0:63> from the memory device 404. In one embodiment, the control circuit 406 stores sixteen values for the DINITRES signal, each corresponding to one of sixteen values for the phase adjustment word PHADJ<0:4>, and selects the final phase adjustment word from among the ones of the sixteen values that resulted in the successful capture of the data packet D<0:63>. One procedure that may be executed by the control circuit 406 in determining the final phase adjustment word PHADJ<0:4> is described in more detail in U.S. patent application Ser. No. 08/890,055 to Baker et al., which is incorporated herein by reference.

After selecting the optimum one of the PHADJ<0:4> words, the control circuit 406 transfers the selected phase adjustment word PHADJ<0:4> to the memory device 404 in a corresponding read synchronization request packet READSYNC<0:39>. The command buffer and address capture circuit 46 and command decoder and sequencer 408 in the memory device 404 then operate as previously described to latch a final phase command word CMDPH<0:3> corresponding to the final phase adjustment word PHADJ<0:4> in the phase select latch 416. Upon the final phase command word CMDPH<0:3> being latched in the phase select latch 416, the clock generation circuit 418 thereafter generates the delayed read clock signal DRCLK having a phase relative to the read clock signal RCLK that corresponds to the final phase command word CMDPH<0:3>, and this phase is utilized during normal read operations of the memory device 404. This final phase command word CMDPH<0:3> sets the phase of DRCLK relative RCLK so that the timing offset between the data clock signals DCLK0 and DCLK1 and data packet words D<0:15> applied on the data bus DQ enables the memory controller 402 to successfully capture the data packet words. The control circuit 406 thereafter deactivates the SELCLK signal and operates identically in synchronizing the data clock signal DCLK1, which, for the sake of brevity, will not be described in further detail. It should be noted that although only a single DRCLK signal is shown in FIG. 4. independent DRCLK signals would be utilized to independently synchronize the DCLK0 and DCLK1 signals. Alternatively, two phase select latches 416 could store respective CMDPH<0:3> words for the DCLK0 and DCLK1 signals, and then the CMDPH<0:3> word corresponding to the selected one of the DCLK0 and DCLK1 signals would be applied to the clock generation circuit 418.

One skilled in the art will realize that the procedure executed by the control circuit 406 in synchronizing the data clock signals DCLK0. DCLK1 may vary. For example, in the above-described procedure the control circuit 406 captures only one data packet D<0:63> at each phase of the DRCLK signal. In another embodiment, the control circuit 406 may perform a predetermined number of comparisons at a given phase of the DRCLK signal and corresponding timing offset of the D<0:15> words relative to the data clocks DCLK0 and DCLK1 before storing a value for the DINITRES signal. In this embodiment, the control circuit 406 may, for example, control components of the memory controller 402 so that eight data packets D<0:63> are captured and compared at each phase of the DRCLK signal. When all eight of these comparisons indicate successful captures, the control circuit 406 stores a "1" for the DINITRES signal at this phase. However, if any of the comparisons at a given phase indicates an unsuccessful capture, the control circuit 406 stores a "0" for the DINITRES signal at this phase. Once again, after sixteen, for example, DINITRES signals have been stored, the control circuit 406 determines the final phase adjustment word PHADJ<0:4> and transfers this word to the memory device 404 which, in turn, applies this word to the clock generation circuit 418 in the form of the final phase command word CMDPH<0:3> to thereby determine the final phase of the DRCLK signal.

Figure 6:
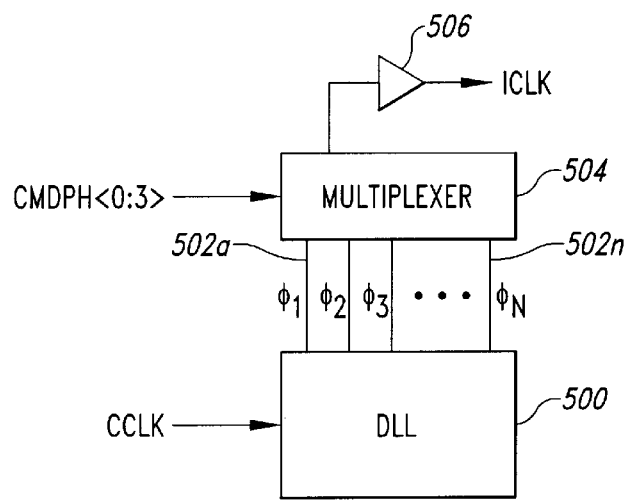
FIG. 6 is a more detailed block diagram of one embodiment of the programmable-delay clock generation circuit of FIG. 4.

The overall operation of the read synchronization system 400 and general operation of several components within that circuit have now been described with reference to FIG. 4. At this point, several components of the read synchronization system 400 contained within the memory controller 402 and memory device 404 will now be described in more detail. FIG. 6 is a functional block diagram of one embodiment of the programmable-delay) clock generation circuit 418 of FIG. 4 including a delay-locked loop 500 that develops a plurality of clock signals 502a–n in response to the CCLK signal. The clock signals 502a–n have phase shifts, designated $\phi_1$–$\phi_N$, respectively, relative to the CCLK signal. In the embodiment of FIG. 6, the delay-locked loop 500 develops 16 clock signals 502a–n and maintains a phase shift of 180° between the clock signals 502a and 502n. Thus, in this embodiment, the phases of the clock signals 502a–n increase in increments of 11.25° from the phase $\phi_1$ to $\phi_{16}$. In other words, the clock signal 502a has a phase $\phi_1$ relative to the CCLK signal, and each of the clock signals 502b–n has a phase 11.25° greater than the preceding phase such that the clock signal 502n has the phase $\phi_{16}$ that is 180° greater than the phase $\phi_1$.

The clock signals 502a–n are applied to respective inputs of a multiplexer 504 that also receives the phase command word CCMDPH<0:3>. In response to the phase command word CCMDP1<0:3>, the multiplexer 504 couples one of the clock signals 502a–n to an output and through a buffer 506 to generate the ICCLK signal. The value of the phase command word CCMDPH<0:3> determines which of the clock signals 502a–n is used to generate the ICCLK signal and thereby determines the phase of the ICCLK signal relative to the CCLK signal. A more detailed description of one embodiment of the programmable-delay clock generation circuit 418 is described in U.S. patent application Ser. No. 08/811,918 to Manning, which is incorporated herein by reference.

Figure 7:
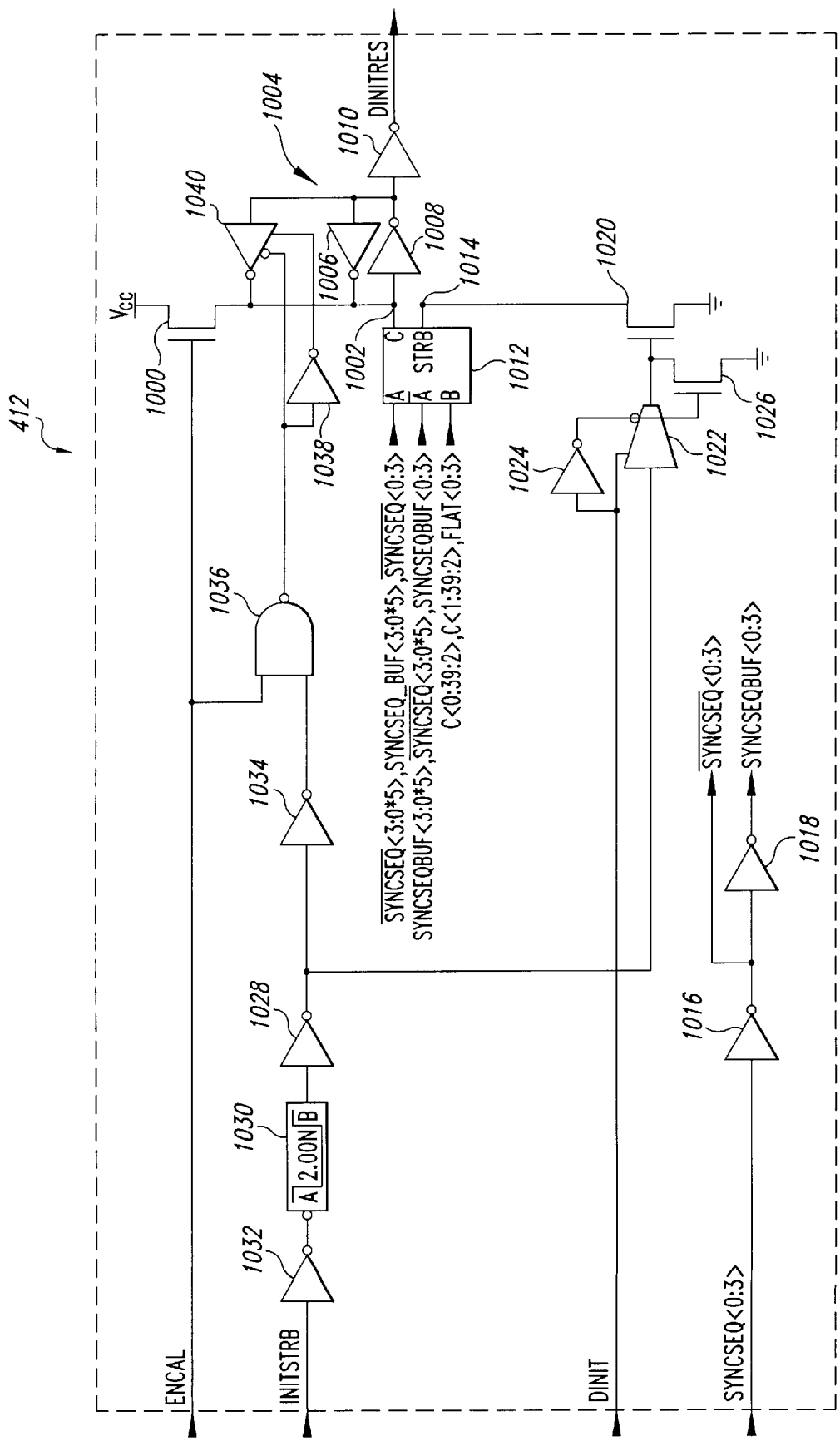
FIG. 7 is a schematic of one embodiment of the evaluation circuit of FIG. 4.

FIG. 7 illustrates one embodiment of the evaluation circuit 412 of FIG. 4, which, as previously described, compares the data word D<0:63> to expected values determined by the SYNCSEQ<0:3> word, and generates the DINITRES signal having a value indicating the result of this comparison. The evaluation circuit 412 includes a PMOS reset transistor 1000 coupled between a supply voltage source $V_{CC}$ and a sensing node 1002 and receiving an enable calibration signal ENCAL from the control circuit 406 applied on its gate. A latch 1004 including two cross-coupled inverters 1006, 1008 has its input coupled to the sensing node 1002 and its output coupled to an input of an inverter 1010 which develops the DINITRES signal on its output in response to the output of the latch 1004.

The evaluation circuit 412 further includes a compare circuit 1012 coupled between the sensing node 1002 and an enable node 1014. The compare circuit 1012 receives the latched data word D<0:63> and further receives a plurality of signals derived from the synchronization sequence word SYNCSEQ<0:3> generated by the control circuit 406. More specifically, each bit of the synchronization sequence word SYNCSEQ<0:3> is coupled through a respective inverter 1016 to generate a complementary synchronization sequence word $\overline{\text{SYNCSEQ}}$<0:3> which, in turns is further coupled through a respective inverter 1018 to generate a buffered synchronization sequence word SYNCSEQBUF<0:3>. The $\overline{\text{SYNCSEQ}}$<0:3> and SYNCSEQBUF<0:3> words are utilized by the compare circuit 1012 in determining whether each of the bits in the data word D<0:63> has its expected value, as will be explained in more detail below.

The evaluation circuit 412 further includes an enable transistor 1020 coupled between the enable node 1014 and ground. An inverter 1028 has its output applied through a transmission gate 1022 to the gate of the enable transistor 1020. The control circuit 406 applies a command initialization signal DINIT directly and through an inverter 1024 to the control terminals of the transmission gate 1022. The output of the inverter 1024 is further applied to a gate of a transistor 1026 coupled between the gate of the enable transistor 1020 and ground. When the DINIT signal goes active high, the inverter 1024 drives its output low turning OFF the transistor 1026 and turning ON the transmission gate 1022 and thereby coupling the output of the inverter 1028 to the gate of the enable transistor 1020. Thus, when the DINIT signal is active high, the level at the output of the inverter 1028 determines whether the enable transistor 1020 turns ON or OFF. The control circuit 406 applies an initialization strobe signal INITSTRB through an inverter 1032 to an input of a pulse generator 1030 which, in turn, outputs a pulse signal to the input of the inverter 1028. When the INITSTRB signal goes active high, the inverter 1032 drives its output low causing the pulse generator 1030 to apply a low pulse signal on the input of the inverter 1028, which, in turn, drives its output high for the duration of this pulse. This high output from the inverter 1028 is coupled through the transmission gate 1022, when activated, turning ON the enable transistor 1022.

The output of the inverter 1028 is further coupled through an inverter 1034 to one input of a NAND gate 1036 receiving the ENCAL signal on a second input. The output of the NAND gate 1036 is applied directly and through an inverter 1038 to enable terminals of a buffer 1040 coupled between the output of the latch 1004 and the sensing node 1002 as shown. When the output of the NAND gate 1036 goes low, the buffer 1040 is enabled and applies the inverse of the signal on the output of the latch 1004 on the sensing node 1002. If the output of the NAND gate 1036 is high, the buffer 1040 is disabled, placing its output in a high impedance state.

Figure 8:
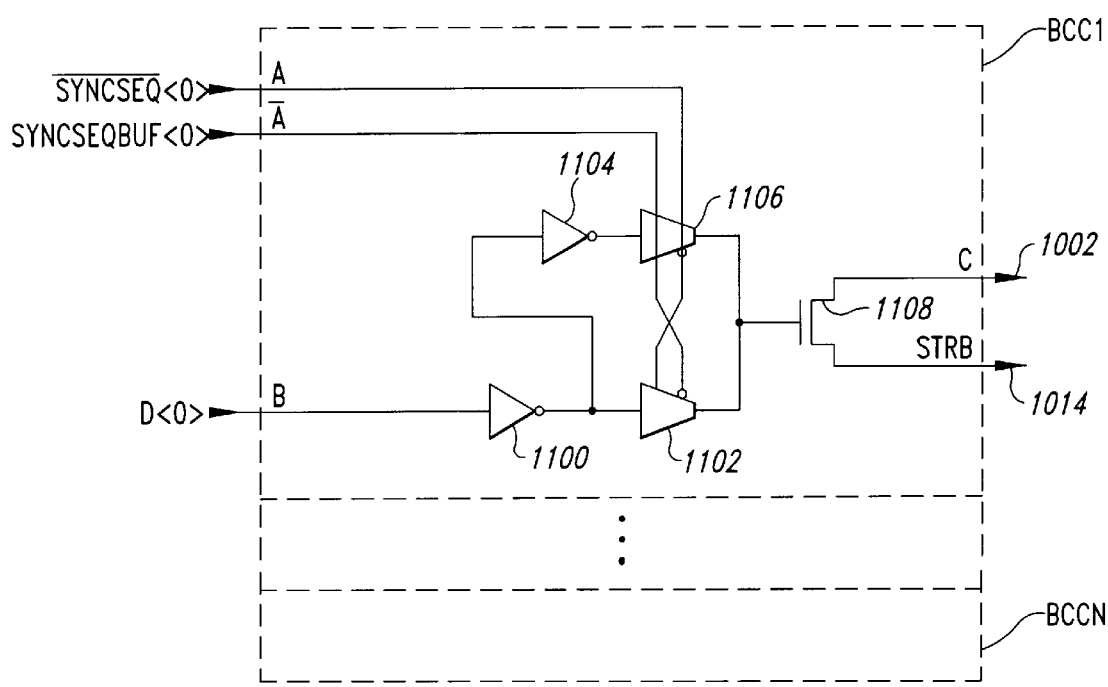
FIG. 8 is a schematic of one embodiment of the compare circuit of FIG. 7.

FIG. 8 is a more detailed schematic of the compare circuit 1012 of FIG. 7 including a plurality of bit compare circuits BCC1–BCCN. There is one bit compare circuit BCC1–BCCN for each bit compared by the compare circuit 1012. In the embodiment of FIG. 8, the compare circuit 1012 includes 64 bit compare circuit BCC1–BCC64, one for each bit of the data word D<0:63>. All the bit compare circuits BCC1–BCCN are identical, and thus, for the sake of brevity, only the bit compare circuit BCC1 will be described in more detail. The bit compare circuit BCC1 receives the bit D<0> of the data word D<0:63>, and applies this bit through a first inverter 1100 to an input of a first transmission gate 1102, and through the first inverter 1100 and a second inverter 1104 to the input of a second transmission gate 1106. The transmission gates 1102 and 1106 receive the $\overline{\text{SYNCSEQ}}$<0> and SYNCSEQBUF<0> signals on their respective control terminals as shown, and are activated in a complementary manner in response to the values of these signals. When the $\overline{\text{SYNCSEQ}}$<0> signal is high and SYNCSEQBUF<0> signal is low, the transmission gate 1102 turns ON and transmission gate 1106 turns OFF, and when the signals $\overline{\text{SYNCSEQ}}$<0> and SYNCSEQBUF<0> are low and high, respectively. the transmission gate 1106 turns ON and transmission gate 1102 turns OFF. The outputs of the transmission gates 1102 and 1106 are applied to a gate of a comparison transistor 1108 coupled between the sensing node 1002 and the enable node 1014.

In operation, the bit compare circuit BCC1 compares the value of the bit D<0> to its expected value determined by the values of the bits $\overline{\text{SYNCSEQ}}$<0> and SYNCSEQBUF<0> and activates the compare transistor 1108 when the bit D<0> does not have its expected value, as will now be explained in more detail. The control circuit 406 (see FIG. 4) determines an expected value for the data bit D<0> corresponding to one of the bits in the SYNCSEQ<0:3> word, as previously described. When the expected value of the data bit D<0> is high, the control circuit 406 generates $\overline{\text{SYNCSEQ}}$<0> and SYNCSEQBUF<0> signals that are high and low, respectively, turning ON transmission gate 1102 and turning OFF transmission gate 1106. The data bit D<0> is then applied through the inverter 1100 and through the turned ON transmission gate 1102 to the gate of the compare transistor 1108. If the data bit D<0> is high as expected, the inverter 1100 applies a low signal through the transmission gate 1102 to the gate of the compare transistor 1108, turning OFF this transistor. In contrast, if the data bit D<0> is a binary 0 instead of a binary 1 as expected, the inverter 1100 drives its output high and this high output is applied through the transmission gate 1102 to the gate of the transistor 1108. In response to the high signal on its gate, the transistor 1108 turns ON, coupling the sensing node 1002 to the enable node 1014.

When the expected value of the data bit D<0> is a binary 0, the control circuit 406 drives the $\overline{\text{SYNCSEQ}}$<0> and SYNCSEQBUF<0> signals low and high, respectively, turning ON the transmission gate 1106 and turning OFF the transmission gate 1102. The data bit D<0> is then applied through the inverters 1100 and 1104 and through the turned ON transmission gate 1106 to the gate of the compare transistor 1108. If the data bit D<0> is a binary 0 as expected, the inverter 1104 drives its output low, turning OFF the transistor 1108 and isolating the sensing node 1002 from the enable node 1014. In contrasts if the data bit D<0> is not a binary 0 as expected but is instead a binary 1, the inverter 1104 drives its output high, turning ON the transistor 1108 which couples the sensing node 1002 to the enable node 1014.

Returning now to FIG. 7, the overall operation of the evaluation circuit 412 in comparing the value of each bit in the data word D<0:63> to its expected value will now be described in more detail. As previously described with reference to FIG. 4, the control circuit 406 applies the DINIT, ENCAL, and INITSTRB signals (i.e., indicated as control signals 414 in FIG. 4) to control operation of the evaluation circuit 412. When the DINIT signal is inactive low, the transmission gate 1022 turns OFF and the transistor 1026 turns ON. The turned ON transistor 1026 couples the gate of the enable transistor to ground, turning OFF the enable transistor 1020 which isolates the enable node 1014 from ground. In this situation, the evaluation circuit 412 is deactivated and does not evaluate the data word D<0:63>.

The evaluation circuit 412 is enabled when the DINIT signal is active high turning ON the transmission gate 1022 and enable transistor 1020, which couples the enable node 1014 to approximately ground. The ENCAL signal goes inactive low before evaluation of a particular data word D<0:63>. In response to the low ENCAL signal, the transistor 1000 turns ON. coupling the sensing node 1002 to approximately the supply voltage $V_{CC}$. In response to the high on the sensing node 1002, the latch 1004 drives its output low and the inverter 1010, in turn, drives the DINITRES signal on its output high. At this point, the INITSTRB signal is inactive low and the pulse generator 1030 drives its output high causing the inverter 1028 to drive its output low. The low output from the inverter 1028 is applied through the turned ON transmission gate 1022 to the gate of the enable transistor 1020, turning OFF this transistor and thereby isolating the enable node 1014 from ground. It should be noted that when the ENCAL signal goes inactive low, the NAND gate 1036 deactivates the buffer 1040 enabling the transistor 1000 to more easily drive the sensing node 1002 high.

Once the ENCAL signal has gone inactive low, disabling and resetting the evaluation circuit 412, the ENCAL signal thereafter goes active high, enabling the evaluation circuit 412 to begin comparing latched data word D<0:63>. At this point, the control circuit 406 applies the generated synchronization sequence word SYNCSEQ<0:3> to the evaluation circuit 412 and the corresponding $\overline{\text{SYNCSEQ}}$<0:3> and SYNCSEQBUF<0:3> words are, in turn, applied to the compare circuit 1012, indicating the expected value for each of the bits in the latched D<0:63> word. At this point, the expected data in the form of the $\overline{\text{SYNCSEQ}}$<0:3> and SYNCSEQBUF<0:3> words and the latched data word D<0:63> is applied to the compare circuit 1012. but the compare circuit 1012 is not yet enabled since the transistor 1020 is turned OFF. The INITSTRB signal then goes active high and the pulse generator 1030. in turn, generates the low pulse on its output, causing the inverter 1028 to pulse its output high and thereby turn ON the enable transistor 1020 so that the compare circuit 1012 compares the latched data word D<0:63> to the expected data.

As previously described with reference to FIG. 8, when each bit of the data word D<0:63> has its expected value, the corresponding compare transistor 1108 coupled between the sensing node 1002 and enable node 1014 does not turn ON. Thus, when the latched data word D<0:39> has its expected value, none of the transistors 1108 in the compare circuit 1012 turns ON and the sensing node 1002 remains at approximately the supply voltage $V_{CC}$. Accordingly, when the data word D<0:63> has its expected value, the voltage on the sensing node 1002 remains high such that the latch 1004 maintains its output low and the inverter 1010 continues driving the DINITRES signal active high indicating the latched data word D<0:63> was successfully captured. If any of the bits in the data word D<0:63> does not have its expected value, the corresponding compare transistor 1108 turns ON, coupling the sensing node 1002 to approximately ground. When the sensing node 1002 goes low, the latch 1004 drives its output high causing the inverter 1010 to drive the DINITRES signal low, indicating the data word D<0:63> was not successfully captured.

It should be noted that the low pulse on the output of the pulse generator 1030 results in the inverter 1034 also pulsing its output low, which causes the NAND gate 1036 to drive its output high for the duration of this pulse. As previously described, when the output of the NAND gate 1036 goes high, the buffer 1040 is disabled to enable the sensing node 1002 to be more easily driven low if any of the bits were not successfully captured. After the end of the pulse generated by the pulse generator 1030, the NAND gate 1036 again drives its output low enabling the buffer 1040 to drive the sensing node 1002 to its desired value. As will be understood by one skilled in the art, the sensing node 1002 may present a rather large capacitance due to all the components coupled in parallel to this node, and the buffer 1040 includes transistors sized such that the buffer 1040 may drive this relatively large capacitance to its desired voltage and in this way assists the inverter 1006, which typically has smaller sized transistors.

It is to be understood that even though various embodiments and advantages of the present invention have been set forth in the foregoing description, the above disclosure is illustrative only, and changes may be made in detail, and yet remain within the broad principles of the invention. For example. many of the components described above may be implemented using either digital or analog circuitry, or a combination of both, and also, where appropriate. may be realized through software executing on suitable processing circuitry. Therefore, the present invention is to be limited only by the appended claims.

I claim:

1. A method of adaptively adjusting the timing offset of a digital signal relative to a clock signal output substantially coincident with the digital signal to enable a latch receiving the digital signal to store the digital signal responsive to the clock signal, the method comprising:

applying the digital signal to the latch;

storing the digital signal in the latch responsive to the clock signal;

evaluating the stored digital signal to determine if the stored digital signal has an expected value and storing the result of this evaluation;

adjusting the timing offset of the digital signal relative to the clock signal;

repeating storing the digital signal in the latch through adjusting the timing offset of the digital signal for a plurality of timing offsets;

selecting a final timing offset of the digital signal from the ones of the timing offsets that caused the latch to store the digital signal having the expected value; and adjusting the timing offset of the digital signal relative to the clock signal to the selected final timing offset.

2. The method of claim 1 wherein adjusting the timing offset of the digital signal relative to the clock signal comprises:

generating the clock signal in response to a second clock signal having a constant phase shift relative to the clock signal;

generating a third clock signal having a phase shift relative to the second clock signal; and adjusting the timing offset of the digital signal responsive to changes in the phase shift of the third clock signal.

3. The method of claim 1 wherein applying the digital signal to the latch comprises applying a repeating 15 bit pseudo-random bit sequence of "111101011001000."

4. The method of claim 1 wherein storing the digital signal in the latch responsive to the clock signal comprises storing the digital signal in the latch responsive to falling and rising edges of the clock signal.

5. A method of synchronizing read clock signals generated by a packetized memory device coincident with read data transferred from the packetized memory device to an external device, the method comprising:

placing the packetized memory device in a read synchronization mode of operation;

outputting read clock signals and coincident read digital signals from the memory device, the read digital signals having a timing offset relative to the read clock signal;

capturing the read digital signals in the external device responsive to the read clock signal;

determining whether the captured read digital signals have expected values;

applying a signal to the memory device to adjust the timing offset of the read digital signal relative to the read clock signal;

repeating outputting read clock signals and coincident read digital signals from the memory device through applying a signal to the memory device to adjust the timing offset until a plurality of read digital signals at respective timing offsets have been captured in the external device;

selecting a final timing offset from among the timing offsets that resulted in the external device successfully capturing the read digital signal; and applying a signal to the memory device to adjust the timing offset of the read digital signals to the selected final timing offset.

6. The method of claim 5 wherein placing the packetized memory device in the read synchronization mode comprises the external device applying a read synchronization request packet on a command-address bus of the packetized memory device.

7. The method of claim 5 wherein outputting read clock signals and coincident read digital signals comprises applying a data clock signal having a predetermined frequency on a clock terminal and applying a repeating 15 bit pseudo-random bit sequence of "111101011001000" on a data bus for the read digital signal.

8. The method of claim 5 wherein applying a signal to the memory device to adjust the timing offset of the read digital signal relative to the read clock signal comprises applying a read synchronization request packet to the memory device over a command-address bus and adjusting the timing offset responsive to phase adjustment bits of the read synchronization request packet.

9. The method of claim 5 wherein capturing the read digital signals in the external device responsive to the read clock signal comprises capturing the read digital signals responsive to falling and rising edges of the read clock signal.

10. The method of claim 5 wherein applying a signal to the memory device to adjust the timing offset of the read digital signals to the selected final timing offset comprises applying a read synchronization request packet on a command-address bus of the memory device which includes phase adjustment bits corresponding to the selected timing offset and thereafter applying a stop read synchronization packet to the memory device over the command-address bus.

11. A method of adjusting the timing offset of read digital signals relative to a read clock signal in a packetized memory device, the read digital signals and read clock signal being applied by the packetized memory device to an external device, the method comprising:

placing the packetized memory device in a read synchronization mode of operation;

generating the read clock signal responsive to a first internal clock signal;

outputting read data from the memory device responsive to a second internal clock signal having a phase shift relative to the first internal clock signal;

capturing the read data in the external device responsive to the read clock signal;

determining whether the captured read data has an expected value;

applying a signal to the memory device to adjust the phase of the second internal clock signal;

repeating outputting read data from the memory device responsive to the second internal clock through applying a signal to the memory device to adjust the phase of the second internal clock signal a plurality of times and determining whether the captured read data at each phase of the second internal clock signal has its corresponding expected value;

selecting a final phase shift of the second internal clock signal from among phase shifts resulting in the external device successfully capturing the read data; and applying a signal to the memory device to adjust the phase shift of the second internal clock signal to the selected final phase shift.

12. The method of claim 11 wherein placing the packetized memory device in the read synchronization mode comprises the external device applying a read synchronization request packet on a command-address bus of the packetized memory device.

13. The method of claim 11 wherein outputting read data from the memory device comprises outputting a repeating 15 bit pseudo-random bit sequence of "111101011001000."

14. The method of claim 11 wherein applying a signal to the memory device to adjust the phase of the second internal clock signal comprises applying a read synchronization request packet to the memory device over a command-address bus and adjusting the phase of the second internal clock signal responsive to phase adjustment bits of the read synchronization request packet.

15. The method of claim 11 wherein capturing the read data in the external device responsive to the read clock signal comprises capturing the read data responsive to falling and rising edges of the read clock signal.

16. The method of claim 11 wherein applying a signal to the memory device to adjust the phase shift of the second internal clock signal to the selected final phase shift comprises applying a read synchronization request packet on a command-address bus of the memory device which includes phase adjustment bits corresponding to the selected final phase shift and thereafter applying a stop read synchronization packet to the memory device over the command-address bus.

17. A read synchronization circuit that adaptively adjusts the timing offset of digital signals applied on respective signal terminals relative to an external clock signal applied on an external clock terminal substantially coincident with the digital signals to enable an external device to latch the digital signals responsive to the external clock signal, comprising:
a digital signal pattern generator that generates predetermined synchronization digital signals responsive to an activation signal;
a register and clocking circuit having an input coupled to the pattern generator, an output coupled to the signal terminals, and first and second internal clock terminals adapted to receive respective first and second internal clock signals, the circuit clocking in the synchronization data signals from the pattern generator responsive to the first internal clock signal, clocking the synchronization data signals onto the signal terminals responsive to the second internal clock signal, and generating the external clock signal responsive to the first internal clock signal;
a clock control circuit controlling the phase of the second internal clock signal relative to the first internal clock signal responsive to a phase command signal;
a control circuit coupled to the pattern generator, clock control circuit, and coupled to a control bus adapted to receive control signals, the control circuit operable responsive to a synchronization command applied on the control bus to activate the pattern generator and apply a phase command signal to the clock control circuit, and to adjust the value of the phase command signal responsive to subsequent synchronization command signals applied on the control bus.

18. The read synchronization circuit of claim 17 wherein the digital signal pattern generator generates the repeating 15 bit pseudo-random bit sequence "111101011001000" for the synchronization digital signals.

19. The read synchronization circuit of claim 17 wherein the control circuit comprises:
a command buffer and address capture circuit adapted to latch and output command-address signals applied on a command address bus;
a command decoder and sequencer coupled to the output of the command buffer and address capture circuit that generates a plurality of control signals responsive to the latched command-address signals, and generates a phase command word responsive to adjustment signals included in the latched command-address signals; and
a phase select latch coupled to the command decoder and sequencer that latches the phase command word output from the command decoder and sequencer and applies the latches phase command word to the clock control circuit.

20. The read synchronization circuit of claim 17 wherein the output of the register and clocking circuit is coupled to a data bus and the register and clocking circuit generates first and second data clock signals on respective first and second external clock terminals.

21. A packetized dynamic random access memory, comprising:
at least one array of memory cells adapted to store data at a location determined by a row address and a column address;
a row address circuit adapted to receive and decode the row address, and select a row of memory cells corresponding to the row address responsive to a first set of command signals;
a column address circuit adapted to receive or apply data to one of the memory cells in the selected row corresponding to the column address responsive to a second set of command signals;
a write data path circuit adapted to couple data between a data bus and the column address circuit responsive to a third set of command signals and having a latch adapted to receive and latch data packets applied on the data bus responsive to a first internal clock signal generated responsive to an external data clock signal applied on an external data clock terminal;
a command buffer receiving command packets and initialization packets, the command buffer including a latch storing each of the received packets responsive to a transition of a second internal clock signal generated responsive to a second external clock signal, the command buffer further generating respective command words and initialization words corresponding to each received command packet and initialization packet, respectively; and
a read data path circuit adapted to couple data between the data bus and the column address circuit responsive to a fourth set of command signals during normal operation of the memory device, and comprising a read synchronization circuit that adaptively adjusts the timing offset of data signals output on the data bus relative to a data clock signal applied by the read data path circuit on the data clock terminal substantially coincident with the data signals comprising:
a digital signal pattern generator that generates predetermined synchronization digital signals responsive to an activation signal;
a register and clocking circuit having an input coupled to the pattern generator, an output coupled to the data bus, and first and second read clock terminals adapted to receive respective first and second internal read clock signals, the circuit clocking in the synchronization data signals from the pattern generator responsive to the first internal read clock signal, clocking the synchronization data signals onto the data bus responsive to the second internal read clock signal, and generating the external data clock signal on the external data clock terminal responsive to the first internal read clock signal;

a clock control circuit controlling the phase of the second internal read clock signal relative to the first internal read clock signal responsive to a phase command signal; and a control circuit coupled to the pattern generator, clock control circuit, and coupled to the command buffer, the control circuit operable when the command buffer outputs an initialization word responsive to received command packet corresponding to a read synchronization request packet to activate the pattern generator and apply a phase command signal to the clock control circuit, and to adjust the value of the phase command signal responsive to subsequent initialization words output from the command buffer.

22. The packetized dynamic random access memory of claim 21 wherein the digital signal pattern generator generates the repeating 15 bit pseudo-random bit sequence "111101011001000" for the synchronization digital signals.

23. The packetized dynamic random access memory of claim 21 wherein the read synchronization circuit of the data path circuit develops two phase command signals corresponding to respective data clock signals to adjust the timing offset of data signals on the data bus relative to each data clock.

24. A memory controller, comprising:

external signal terminals adapted to receive respective digital signals;

an external clock terminals adapted to receive an external clock signal;

a circuit transferring data between a processor data bus and selected ones of the signal terminals, and generating a plurality of command and clock signals on respective signal terminals;

a clock generator generating an internal clock signal responsive to the external clock signal, the internal clock signal having a fixed phase relative to the external clock signal;

a latch that latches digital signals applied on the external signal terminals responsive to the internal clock signal;

an evaluation circuit coupled to the latch and generating a results signal responsive to the digital signals sequentially stored in the latch which indicates whether each of the latched digital signals has an expected value; and a control circuit operating in a read synchronization mode to apply command packets to a packetized memory device coupled to the controller causing the packetized memory device to apply predetermined synchronization signals on the data bus and a data clock signal on the data clock terminal having a timing offset relative to the synchronization signals determined by the command packet, the control circuit thereafter controlling the evaluation circuit to develop a plurality of results signals, each corresponding to a respective timing offset, and then selecting a final timing offset from among the timing offsets that resulted in the latch successfully capturing the synchronization signals, and applying a command packet causing the memory device to adjust the timing offset of the synchronization signals to the selected final timing offset.

25. The memory controller of claim 24 wherein the evaluation circuit compares the values of the bits in a 64 bit data word D<0:63> latched by the latch to predetermined expected values determined by the control circuit.

26. A memory system, comprising:

a packetized memory device, comprising, at least one array of memory cells adapted to store data at a location determined by a row address and a column address;

a row address circuit adapted to receive and decode the row address, and select a row of memory cells corresponding to the row address responsive to a first set of command signals;

a column address circuit adapted to receive or apply data to one of the memory cells in the selected row corresponding to the column address responsive to a second set of command signals;

a write data path circuit adapted to couple data between a data bus and the column address circuit responsive to a third set of command signals, and having a latch adapted to receive and latch data packets applied on the data bus responsive to a first internal clock signal generated responsive to an external data clock signal applied on an external data clock terminal;

a command buffer receiving command packets and initialization packets on a command-address bus, the command buffer including a latch storing each of the received packets responsive to a transition of a second internal clock signal generated responsive to a second external clock signal, the command buffer further generating respective command words and initialization words corresponding to each received command packet and initialization packet, respectively; and a read data path circuit adapted to couple data between the data bus and the column address circuit responsive to a fourth set of command signals during normal operation of the memory device, and comprising a read synchronization circuit that adaptively adjusts the timing offset of data signals output on the data bus relative to a data clock signal applied by the read data path circuit on the data clock terminal substantially coincident with the data signals, comprising:

a digital signal pattern generator that generates predetermined synchronization digital signals responsive to an activation signal;

a register and clocking circuit having an input coupled to the pattern generator, an output coupled to the data bus, and first and second read clock terminals adapted to receive respective first and second internal read clock signals, the circuit clocking in the synchronization data signals from the pattern generator responsive to the first internal read clock signal, clocking the synchronization data signals onto the data bus responsive to the second internal read clock signal, and generating the external data clock signal on the external data clock terminal responsive to the first internal read clock signal;

a clock control circuit controlling the phase of the second internal read clock signal relative to the first internal read clock signal responsive to a phase command signal; and a control circuit coupled to the pattern generator, clock control circuit, and coupled to the command buffer, the control circuit operable when the command buffer outputs an initialization word responsive to received command packet corresponding to a read synchronization request packet to activate the pattern generator and apply a phase command signal to the clock control circuit, and to adjust the value of the phase command signal responsive to subsequent initialization words output from the command buffer; and a memory controller coupled to the command-address bus, data bus and clock terminals of the packetized memory device, comprising, a circuit transferring data between a processor data bus and the data bus of the memory device responsive to control signals received on control terminals, and applying command packets and clock signals to control the memory device;

a clock generator generating an internal clock signal responsive to the read clock signal from the memory device, the internal clock signal having a fixed phase relative to the read clock signal;

a latch that latches digital signals applied on the data bus responsive to the internal clock signal;

an evaluation circuit coupled to the latch and generating a results signal responsive to the digital signals sequentially stored in the latch which indicates whether each of the latched digital signals has an expected value; and a control circuit operating in a read synchronization mode to apply command packets to the packetized memory device causing the packetized memory device to apply predetermined synchronization signals on the data bus and the data clock signal on the data clock terminal having a timing offset relative to the synchronization signals determined by the command packet, the control circuit thereafter controlling the evaluation circuit to develop a plurality of results signals, each corresponding to a respective timing offset, and then selecting a final timing offset from among the timing offsets that resulted in the latch successfully capturing the synchronization signals, and applying a command packet causing the memory device to adjust the timing offset of the synchronization signals to the selected final timing offset.

27. The memory system of claim 26 wherein the digital signal pattern generator generates the repeating 15 bit pseudo-random bit sequence "111101011001000" for the synchronization digital signals.

28. The memory system of claim 26 wherein the control circuit comprises:

a command buffer and address capture circuit adapted to latch and output command-address signals applied on a command address bus;

a command decoder and sequencer coupled to the output of the command buffer and address capture circuit that generates a plurality of control signals responsive to the latched command-address signals, and generates a phase command word responsive to adjustment signals included in the latched command-address signals; and a phase select latch coupled to the command decoder and sequencer that latches the phase command word output from the command decoder and sequencer and applies the latches phase command word to the clock control circuit.

29. An integrated circuit adapted to receive a plurality of input signals and generate a plurality of output signals on respective, externally accessible terminals, comprising:

a circuit adapted to receive a plurality of input signals applied to respective other of the terminals and to generate a plurality of output signals on respective other of the terminals;

a read synchronization circuit that adaptively adjusts the timing offset of digital signals applied on respective external terminals relative to an external clock signal applied on an external clock terminal substantially coincident with the digital signals to enable an external device coupled to the integrated circuit to latch the digital signals responsive to the external clock signal, comprising, a digital signal pattern generator that generates predetermined synchronization digital signals responsive to an activation signal;

a register and clocking circuit having an input coupled to the pattern generator, an output coupled to the corresponding external terminals, and first and second internal clock terminals adapted to receive respective first and second internal clock signals, the circuit clocking in the synchronization data signals from the pattern generator responsive to the first internal clock signal, clocking the synchronization data signals onto the external terminals responsive to the second internal clock signal, and generating the external clock signal responsive to the first internal clock signal;

a clock control circuit controlling the phase of the second internal clock signal relative to the first internal clock signal responsive to a phase command signal;

a control circuit coupled to the pattern generator, clock control circuit, and coupled to external control terminals of the integrated circuit adapted to receive control signals, the control circuit operable responsive to a synchronization command applied on the control terminals to activate the pattern generator and apply a phase command signal to the clock control circuit, and to adjust the value of the phase command signal responsive to subsequent synchronization command signals applied on the control bus.

30. The integrated circuit of claim 29 wherein the digital signal pattern generator generates the repeating 15 bit pseudo-random bit sequence "111101011001000" for the synchronization digital signals.

31. A computer system, comprising:

a processor having a processor bus;

an input device coupled to the processor through the processor bus adapted to allow data to be entered into the computer system;

an output device coupled to the processor through the processor bus adapted to allow data to be output from the computer system; and a packetized dynamic random access memory coupled to the processor bus, comprising, at least one array of memory cells adapted to store data at a location determined by a row address and a column address;

a row address circuit adapted to receive and decode the row address, and select a row of memory cells corresponding to the row address responsive to a first set of command signals;

a column address circuit adapted to receive or apply data to one of the memory cells in the selected row corresponding to the column address responsive to a second set of command signals;

a write data path circuit adapted to couple data between a data bus portion of the processor bus and the column address circuit responsive to a third set of command signals, and having a latch adapted to receive and latch data packets applied on the data bus responsive to a first internal clock signal generated responsive to an external data clock signal applied on an external data clock terminal;

a command buffer receiving command packets and initialization packets on a command-address bus portion of the processor bus, the command buffer including a latch storing each of the received packets responsive to a transition of a second internal clock signal generated responsive to a second external clock signal, the command buffer further generating respective command words and initialization words corresponding to each received command packet and initialization packet, respectively; and a read data path circuit adapted to couple data between the data bus and the column address circuit responsive to a fourth set of command signals during normal operation of the memory device, and comprising a read synchronization circuit that adaptively adjusts the timing offset of data signals output on the data bus relative to a data clock signal applied by the read data path circuit on the data clock terminal substantially coincident with the data signals, comprising:

a digital signal pattern generator that generates predetermined synchronization digital signals responsive to an activation signal;

a register and clocking circuit having an input coupled to the pattern generator, an output coupled to the data bus, and first and second read clock terminals adapted to receive respective first and second internal read clock signals, the circuit clocking in the synchronization data signals from the pattern generator responsive to the first internal read clock signal, clocking the synchronization data signals onto the data bus responsive to the second internal read clock signal, and generating the external data clock signal on the external data clock terminal responsive to the first internal read clock signal;

a clock control circuit controlling the phase of the second internal read clock signal relative to the first internal read clock signal responsive to a phase command signal; and a control circuit coupled to the pattern generator, clock control circuit, and coupled to the command buffer, the control circuit operable when the command buffer outputs an initialization word responsive to received command packet corresponding to a read synchronization request packet to activate the pattern generator and apply a phase command signal to the clock control circuit, and to adjust the value of the phase command signal responsive to subsequent initialization words output from the command buffer.

32. The computer system of claim 31 wherein the digital signal pattern generator generates the repeating 15 bit pseudo-random bit sequence "111101011001000" for the synchronization digital signals.

* * * * *

UNITED STATES PATENT AND TRADEMARK OFFICE
CERTIFICATE OF CORRECTION

PATENT NO. : 6,029,250  
DATED : February 22, 2000  
INVENTOR(S) : Brent Keeth

Page 1 of 1

It is certified that error appears in the above-identified patent and that said Letters Patent is hereby corrected as shown below:

<u>Title page,</u>  
OTHER PUBLICATIONS,  
Line 16, "vol. 32" should read -- vol. 31 --  
Line 35, "Solid State" should read -- Solid-State --

<u>Column 22,</u>  
Line 55, "a plurality of times" should read -- a plurality of times, --

Signed and Sealed this

Second Day of April, 2002

Attest:

JAMES E. ROGAN  
*Attesting Officer*     *Director of the United States Patent and Trademark Office*